United States Patent
Citerin

(10) Patent No.: US 10,430,667 B2
(45) Date of Patent: Oct. 1, 2019

(54) METHOD, DEVICE, AND COMPUTER PROGRAM FOR RE-IDENTIFICATION OF OBJECTS IN IMAGES OBTAINED FROM A PLURALITY OF CAMERAS

(71) Applicant: CANON KABUSHIKI KAISHA, Tokyo (JP)

(72) Inventor: Johann Citerin, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/380,922

(22) Filed: Dec. 15, 2016

(65) Prior Publication Data

US 2017/0177946 A1    Jun. 22, 2017

(30) Foreign Application Priority Data

Dec. 21, 2015   (GB) .................................. 1522567.5

(51) Int. Cl.
*G06K 9/00* (2006.01)
*G06K 9/46* (2006.01)

(52) U.S. Cl.
CPC ..... *G06K 9/00771* (2013.01); *G06K 9/00295* (2013.01); *G06K 9/4671* (2013.01)

(58) Field of Classification Search
CPC ............. G06K 9/00744; G06K 9/3241; G06K 9/4652; G06T 1/20; G06T 2200/24;
(Continued)

(56) References Cited

U.S. PATENT DOCUMENTS 9,090,260 B2 * 7/2015 Clarke ................. B60W 30/00
9,736,368 B2 * 8/2017 Lablans ................. H04N 5/247
(Continued)

FOREIGN PATENT DOCUMENTS

EP        1427212 A1    6/2004
GB        2470806 A    12/2010
(Continued)

OTHER PUBLICATIONS

Tieu, et al., "Inference of Non-Overlapping Camera Network Topology by Measuring Statistical Dependence", Computer Science and Artificial Intelligence Laboratory Massachusetts Institute of Technology Cambridge, MA 02139, published in Oct. 2005.
(Continued)

*Primary Examiner* — Solomon G Bezuayehu
(74) *Attorney, Agent, or Firm* — Canon U.S.A., Inc. IP Division

(57) ABSTRACT

The present invention relates in particular to a method for re-identification of a target object in images obtained from several image sources, wherein each of the image sources obtains images representing an area associated with the corresponding image source. After having identified a target object in images obtained from one of a pair of image sources, a relative velocity of the target object in comparison with other objects previously identified in images obtained from the one of the pair of image sources is estimated. Then, based on the estimated relative velocity of the target object, a correspondence between the target object identified in images obtained from the one of the pair of image sources and a candidate object represented in images obtained from the other image source of the pair of image sources is established.

18 Claims, 10 Drawing Sheets

(58) Field of Classification Search
CPC . G06T 2207/10016; G06T 2207/20056; G06T 2207/20076; G06T 2207/20104; G06T 2207/30241; G06T 7/246; G06T 7/262; G06T 7/277
USPC .......................................................... 382/103
See application file for complete search history.

(56) References Cited

U.S. PATENT DOCUMENTS

| | | | | |
|---|---|---|---|---|
| 9,852,635 | B2* | 12/2017 | Fukuda | G08G 1/167 |
| 10,019,877 | B2* | 7/2018 | Dvir | G08B 13/19608 |
| 2010/0296697 | A1* | 11/2010 | Ikenoue | H04N 7/18 |
| | | | | 382/103 |
| 2011/0205355 | A1 | 8/2011 | Liu et al. | |
| 2013/0311079 | A1* | 11/2013 | Rakshit | G01C 21/20 |
| | | | | 701/400 |
| 2014/0267775 | A1* | 9/2014 | Lablans | H04N 5/247 |
| | | | | 348/169 |
| 2016/0098612 | A1* | 4/2016 | Viviani | G06K 9/00744 |
| | | | | 382/103 |
| 2017/0163938 | A1* | 6/2017 | Yajima | G08B 21/02 |

FOREIGN PATENT DOCUMENTS

| | | |
|---|---|---|
| WO | 00/45338 A1 | 8/2000 |
| WO | 2009/111498 A2 | 9/2009 |

OTHER PUBLICATIONS

Huang, et al., "Probabilistic Modeling of Dynamic Traffic Flow across Non-overlapping Camera Views", Dept. of Electronics Engineering Computer Science, National Chiao Tung University, Taiwan, published in Aug. 2010.

Patents Act 1977: Combined Search and Examination Report under Sections 17 and 18(3) for GB Patent Application No. 522567.5, dated Jun. 17, 2016.

\* cited by examiner

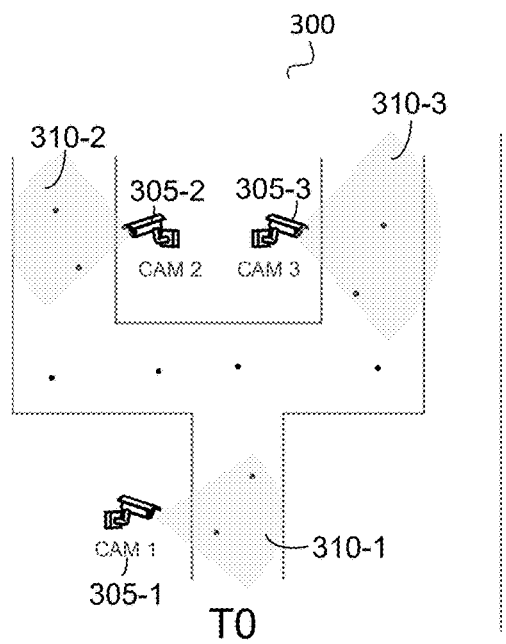
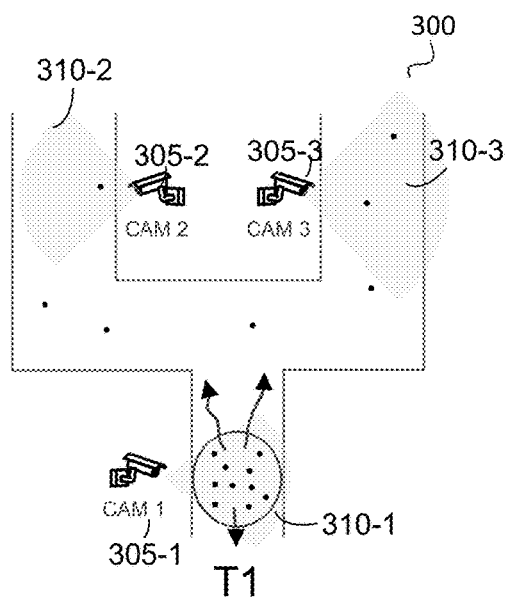
Fig. 3a
Fig. 3b
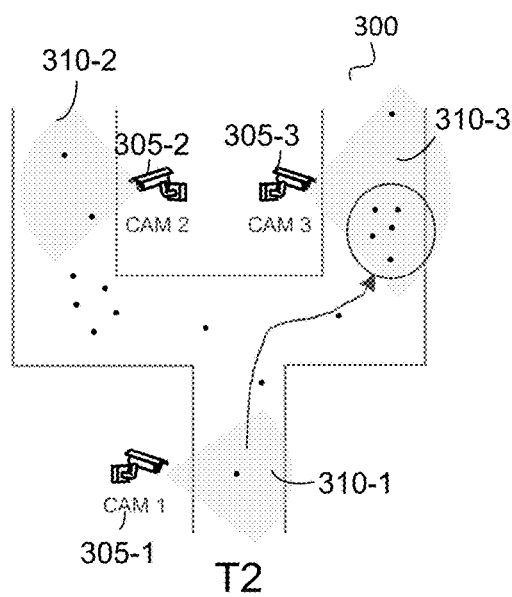
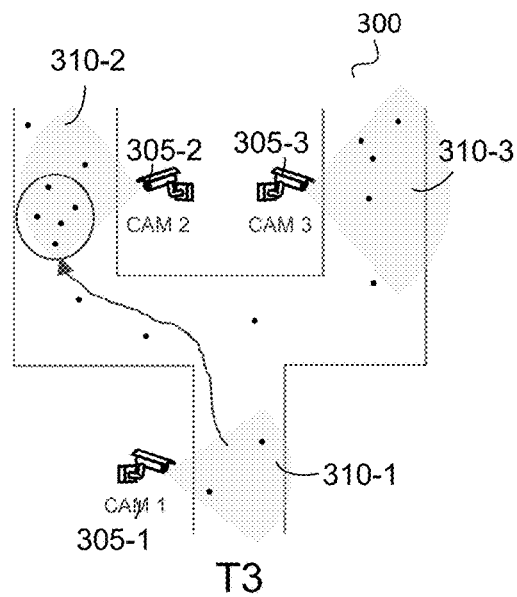
Fig. 3c
Fig. 3d

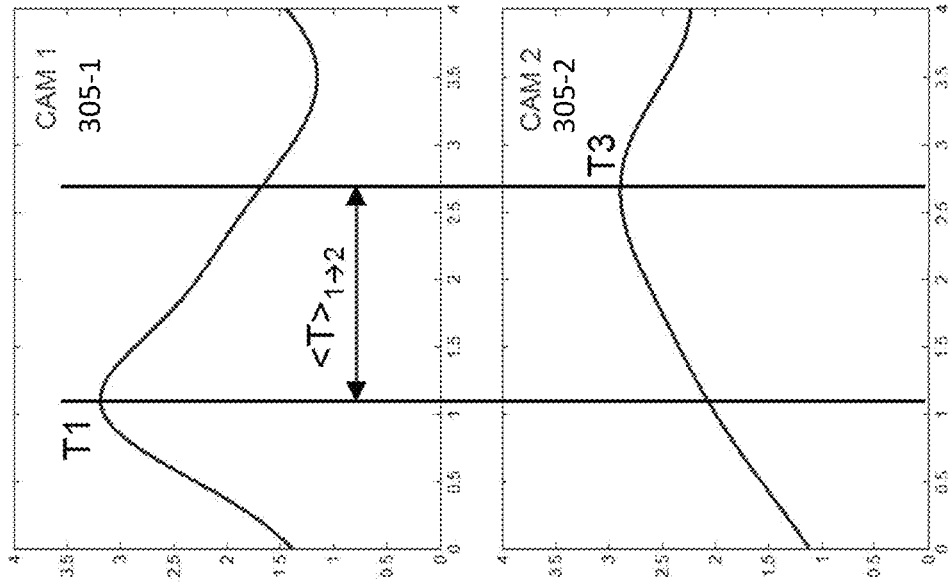
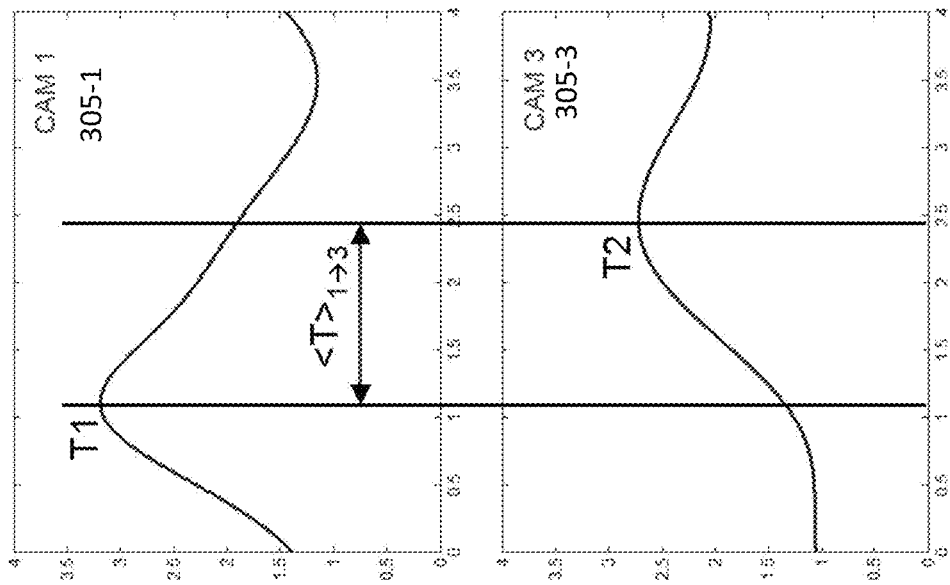

METHOD, DEVICE, AND COMPUTER PROGRAM FOR RE-IDENTIFICATION OF OBJECTS IN IMAGES OBTAINED FROM A PLURALITY OF CAMERAS

This application claims the benefit under 35 U.S.C. § 119(a)-(d) of United Kingdom Patent Application No. 1522567.5, filed on Dec. 21, 2015 and entitled "METHOD, DEVICE, AND COMPUTER PROGRAM FOR RE-IDENTIFICATION OF OBJECTS IN IMAGES OBTAINED FROM A PLURALITY OF CAMERAS". The above cited patent application is incorporated herein by reference in its entirety.

FIELD OF THE INVENTION

The present invention relates in general to video-surveillance systems enabling tracking of targets, and in particular to a method, a device, and a computer program configured for re-identification of objects in images obtained from a plurality of cameras of a video-surveillance system wherein the fields of view of the cameras do not overlap.

BACKGROUND OF THE INVENTION

Video surveillance is currently a fast-growing market which tends to become increasingly widespread for various applications. It can be used today in such areas such as crime prevention, security systems utilized in private and public areas, abnormal event detection, traffic monitoring, customer behaviour or general data gathering, etc.

Despite an ever-increasing usage, a mainstream video surveillance system has strong inherent limitations which may lead to poor performance, especially for solving crimes and offenses, due to the way it is used. Usually, a video surveillance system comprises streaming camera footages to be recorded as well as displayed in real-time to human operators. Unfortunately, only a very limited fraction of camera images can be seen real-time by humans while the rest of footage recordings is used after-action for batch or forensic activities. Usually, this forensic after-action viewing is rarely used, not only because it is often too late and useless at this point, but also because it is a time-consuming task to be performed to retrieve and track people such as offenders moving across several cameras located in different places.

For this reason, VCA (Video Content Analysis) software applications have been developed to be able to perform some automatic video analysis, in order to trigger alarms and make video surveillance far more real-time responsive, as well as to make it easier to exploit the after-action recorded footages such as forensic activities or batch analysis tasks.

In particular, tracking algorithms based on VCAs are particularly important in many video surveillance applications, especially the security applications. These tracking algorithms, comprising detecting and tracking individual displacements of targets (wherein the targets are usually humans or vehicles), may be performed in the following different ways which are quite different in terms of steps to be performed and the uses:
  mono-camera tracking: each of the cameras tracks individually the moves of the targets in the respective field of view. Generally speaking, the different cameras do not share tracking data and/or use the data transmitted from another camera for target tracking;
  multiview tracking (also known as "fusion" or "overlapping fusion"): several cameras configured to track the moves of target objects share an area in their fields of view, the shared area being considered as a common or joint field of view monitored by two or several cameras. This allows solving problems caused by, for example, a limited field of view of a single camera for which certain objects are considered as hidden;
  re-identification tracking (also known as "non-overlapping fusion", or "sparse camera network tracking"): the re-identification tracking is configured to track the moves of target objects monitored by two or several cameras which do not have a common or joint field of view and may even be located far from each other. For example, the target objects to be tracked move across an entire city monitored by a sparse camera network over a long duration such as several days. According to an existing re-identification method for tracking one or several people to be tracked (called "target objects"), images of the target objects need to be recorded by one camera, and compared later to the pre-stored images of candidate people (called "candidate objects") in other cameras so as to determine if the target objects have been recognized (re-identified) by one or several of the other cameras. It is thus possible to sparsely track one target by one camera at a time while the target moves a large distance, which is the objective of re-identification technology. The re-identification tracking is more and more useful to many security based or non-security based applications in which the target tracking is performed offline or in real-time.

The mono-camera tracking and fusion algorithms have been greatly improved over the years and are able to generate decent results.

Many computer vision algorithms have been developed for the re-identification tracking. However, compared to the well-developed mono-camera tracking and fusion algorithms, the re-identification tracking algorithms are still far from perfect in terms of system reliability (e.g. correct tracking rate) and efficiency (e.g. computational time).

The latest algorithms or those being considered as relatively efficient are based on sophisticated machine learning methods. However, the existing algorithms for re-identification may still be very inefficient due to one or several of the following issues:
  only image-based cues: the features used to re-identify are not distinguishing enough. They are essentially pixel-based information such as colors or textures extracted from images; but this is not always sufficient to distinguish similarly looking people. In addition, the pixel-based information may be affected by image artifacts which may be generated and shown in images captured by a camera due to the change of lighting, pose, colorimetry or even simply due to the hardware or software adjustment of cameras;
  too many candidates: in most scenarios, one particular target must be compared to a great number of candidates, which makes this problem similar to the "needle in a haystack" problem and increases considerably the computational complexity and even the probability of failure;
  resource-intensive: as mentioned above, the existing re-identification tracking algorithms are based on sophisticated image features and machine learning methods which need to process a great number of candidates, and thus are very time-consuming and require considerable computational resources. It is not rare that it takes several hours to process a video sequence lasting only several seconds to identify only one or two targets.

Such resource-hungry re-identification tracking algorithms may nevertheless still not be able to track the targets accurately. In addition, since the algorithms are so time-consuming, they are not able to be utilized in real-time target tracking.

Several improved re-identification tracking algorithms have been proposed to reduce the impact brought by one of the above-mentioned issues and thus to increase the efficiency of the algorithms. For example, some improved re-identification tracking methods perform a travel time estimation to reduce the number of candidates, as indicated in a IEEE conference paper "Inference of Non-Overlapping Camera Network Topology by Measuring Statistical Dependence" published by K. Tieu in 2005, and another IEEE conference paper "Probabilistic Modeling of Dynamic Traffic Flow across Non-overlapping Camera Views", published by Huang in 2010.

The travel time estimation performed in the re-identification tracking algorithms comprises a step of measuring the travel times respectively spent by several people moving from the field of view of one camera to that of a neighboring camera and a step of calculating a mean value of the measured travel times, both steps being performed usually during a training phase of the method. The improved re-identification tracking method can thus estimate, based on the mean value of the measured travel times obtained in the training phase, the travel time that the target may need to spend while moving to the field of view monitored by another camera. In other words, the time instant that the target may arrive at the field of view of said another camera can be predicted.

In this way, instead of comparing the target with all the candidates of all of the images obtained by said another camera, only the candidates in images obtained around the time instant need to be processed. The number of candidates can thus be reduced.

However, the probability of failure of the above-mentioned re-identification tracking algorithms may still be high and the computational resources may be nevertheless spent on processing wrong candidates due to the travel time estimation being possibly very different from the real travel time spent by the target.

In addition, some of the above-mentioned re-identification tracking algorithms require human intervention such as manually tagging a group of people shown in images of a video stream during the training phase before measuring their respective travel times.

Consequently, there is a need for improving existing re-identification methods, and in particular, for improving their reliability such as increasing the correct tracking rate and also improving the system efficiency by reducing the need of computational resources.

SUMMARY OF THE INVENTION

The present invention has been devised to address one or more of the foregoing concerns.

According to a first object of the invention, there is provided a method for re-identification of at least one target object in images obtained from at least two image sources, each of the image sources obtaining images representing an area associated with the corresponding image source, the method comprising:
  identifying at least one target object in images obtained from one of a pair of image sources;
  estimating a relative velocity of the at least one target object in comparison with at least another object previously identified in images obtained from the one of the pair of image sources; and
  establishing, based on the estimated relative velocity of the at least one target object, a correspondence between the at least one target object identified in images obtained from the one of the pair of image sources and at least one candidate object represented in images obtained from the other image source of the pair of image sources.

The method of the invention makes it possible to improve the re-identification efficiency by using a relative velocity of a target object to be re-identified in comparison with other detected objects. According to particular embodiments, the method of the invention makes it possible to improve the re-identification efficiency by decreasing the number of possible candidate objects (and thus, the risk of wrongly selecting a candidate object). It also reduces the processing resources needed for re-identification of target objects.

In an embodiment, the method further comprises a step of estimating a travel time of the at least one target object moving from the area associated with the one of the pair of image sources to the area associated with the other one of the pair of image sources, wherein the step of establishing a correspondence is further performed on the estimated travel time of the at least one target object.

In an embodiment, the travel time of the at least one target object is estimated based on the estimated relative velocity of the at least one target.

In an embodiment, the method further comprises a step of estimating, for the pair of image sources, a global travel time distribution for an object moving from the area associated with the one of the pair of image sources to the area associated with the other one of the pair of image sources.

In an embodiment, the step of estimating a travel time of the at least one target object is performed based on the global travel time distribution.

In an embodiment, the method further comprises a step of generating, for each image source of the pair of image sources, an object density measurement which reflects a variation of a number of objects in images obtained via the corresponding image source.

In an embodiment, the global travel time distribution is estimated based on the object density measurements.

In an embodiment, the method further comprises a step of estimating, for each of the at least one candidate object represented in images obtained from the other one of the pair of image sources, a relative velocity (Vrel-c).

In an embodiment, the method further comprises a step of selecting images obtained by the other one of the pair of image sources as a function of a time period determined based on the estimated travel time of the target object, the at least one candidate object being detected in the selected images.

In an embodiment, the method further comprises a step of selecting the at least one candidate object as a function of a relative velocity (Vrel-c) of the at least one candidate object, the relative velocity (Vrel-c) of the at least one candidate object being chosen as a function of the relative velocity (Vrel-t) of the target object.

In an embodiment, the method further comprises a step of extracting, for the at least one target object and each of the at least one candidate object, respective image-based features, and a step of selecting the at least one candidate object based on the extracted image-based features and the relative velocity (Vrel-c) of each of the at least one candidate object, and on the extracted image-based features and the relative velocity (Vrel-t) of the at least one target object.

According to a second object of the invention, there is provided a device for re-identification of at least one target object in images obtained from at least two image sources, each of the image sources obtaining images representing an area associated with the corresponding image source, the device comprising a processor configured for carrying out the steps of:

identifying at least one target object in images obtained from one of a pair of image sources;

estimating a relative velocity of the at least one target object in comparison with at least another object previously identified in images obtained from the one of the pair of image sources; and establishing, based on the estimated relative velocity of the at least one target object, a correspondence between the at least one target object identified in images obtained from the one of the pair of image sources and at least one candidate object represented in images obtained from the other image source of the pair of image sources.

The device of the invention makes it possible to improve the re-identification efficiency by using a relative velocity of a target object to be re-identified in comparison with other detected objects. According to particular embodiments, the device of the invention makes it possible to improve the re-identification efficiency by decreasing the number of possible candidate objects (and thus, the risk of wrongly selecting a candidate object). It also reduces the processing resources needed for re-identification of target objects.

In an embodiment, the processor is further configured for carrying out a step of estimating a travel time of the at least one target object moving from the area associated with the one of the pair of image sources to the area associated with the other one of the pair of image sources, wherein the step of establishing a correspondence is further performed on the estimated travel time of the at least one target object.

In an embodiment, the processor is further configured so that the travel time of the at least one target object is estimated based on the estimated relative velocity of the at least one target.

In an embodiment, the processor is further configured for carrying out a step of estimating, for the pair of image sources, a global travel time distribution for an object moving from the area associated with the one of the pair of image sources to the area associated with the other one of the pair of image sources.

In an embodiment, the processor is further configured so that the step of estimating a travel time of the at least one target object is performed based on the global travel time distribution.

In an embodiment, the processor is further configured for carrying out a step of generating, for each image source of the pair of image sources, an object density measurement which reflects a variation of a number of objects in images obtained via the corresponding image source.

In an embodiment, the processor is further configured so that the global travel time distribution is estimated based on the object density measurements.

In an embodiment, the processor is further configured for carrying out a step of estimating, for each of the at least one candidate object represented in images obtained from the other one of the pair of image sources, a relative velocity (Vrel-c).

In an embodiment, the processor is further configured for carrying out a step of selecting images obtained by the other one of the pair of image sources as a function of a time period determined based on the estimated travel time of the target object, the at least one candidate object being detected in the selected images.

In an embodiment, the processor is further configured for carrying out a step of selecting the at least one candidate object as a function of a relative velocity (Vrel-c) of the at least one candidate object, the relative velocity (Vrel-c) of the at least one candidate object being chosen as a function of the relative velocity (Vrel-t) of the target object.

In an embodiment, the processor is further configured for carrying out a step of extracting, for the at least one target object and each of the at least one candidate object, respective image-based features, and a step of selecting the at least one candidate object based on the extracted image-based features and the relative velocity (Vrel-c) of each of the at least one candidate object, and on the extracted image-based features and the relative velocity (Vrel-t) of the at least one target object.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3, comprising FIGS. 3a to 3d, illustrates an example of acquisition of images of a real scene using three different cameras of the video-surveillance system of which the fields of view (FoV) do not overlap;

FIG. 4, comprising

FIG. 6, comprising FIGS. 6a to 6d, illustrates respectively an object density measurement for cameras of the example as shown in FIGS. 3a to 3d observed between the time instants T0 to T3;

FIG. 7, comprising

FIG. 8, comprising

DETAILED DESCRIPTION OF EMBODIMENTS OF THE INVENTION

Figure 1:
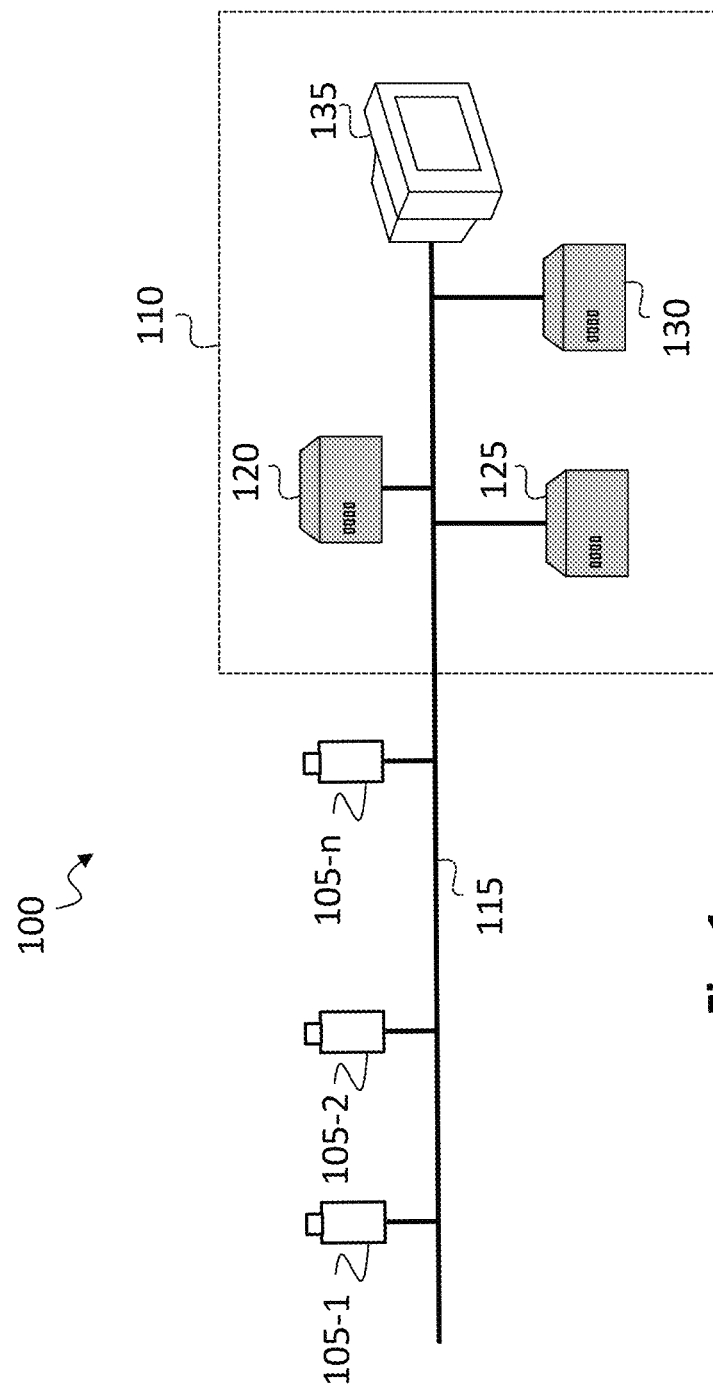
FIG. 1 illustrates an example of a simplified video-surveillance system wherein embodiments of the invention can be implemented.

The method according to embodiments of the invention is used for optimizing, in particular in terms of reliability (e.g. correct tracking rate) and efficiency (e.g. computational time), conventional re-identification methods for tracking target objects. According to an embodiment of the invention, a target object to be tracked is captured by one camera of a video-surveillance system which comprises several cameras. The target object is then re-identified in images (denoted hereafter as "candidate images") captured by at least one neighboring camera.

As mentioned above, the conventional re-identification tracking methods generally need to process all the candidate objects in all candidate images obtained from all of the neighboring cameras. In other words, the number of the candidate objects and that of the candidate images needed to be processed by the conventional re-identification tracking methods are great and the corresponding correct tracking rate may be still low.

By performing the method according to embodiments of the invention, a large number of candidate objects and a large number of candidate images can be eliminated. This can be done in one stage or in several combined stages.

The travel time needed for a target object to move from one camera to another camera may be estimated in a first stage. It is possible to determine therefore substantially for each of the neighboring cameras, in which time period the target object is supposed to arrive at its camera's field of view. According to embodiments of the invention, the method comprises (at least implicitly) an estimation of a relative velocity of the target object. By using a relative velocity of the target object as a criterion, the travel times can be estimated more precisely compared with other known methods. As a consequence, only the images obtained in the time period are to be considered as candidate images, which reduces the number of candidate images and candidate objects to be processed.

In a second stage and according to particular embodiments, a relative velocity can be used, at least implicitly, as a criterion to select among the candidate objects obtained out of the first stage, appropriate candidate objects each presenting a relative velocity similar to that of the target object. Such a second stage leads to further reducing the number of candidate images and candidate objects to be processed.

The first and second stages allow thus to remove wrong candidate objects which have, compared to the target object, a very different travel time and/or a very different relative velocity. Such a removal of the wrong candidate objects improves the result of the re-identification of the target objects and the correct tracking rate achieved by the method of the invention is therefore greater than other known methods. In addition, the computational resources for comparing the target object to the candidate objects of the candidate images can thus be saved since the large number of candidate objects and the large number of candidate images are reduced at the first stage and then at the second stage.

The candidate objects selected during the second stage are then processed by performing re-identification related steps (such as comparing the image-based features of the target object with those of selected candidate objects captured in a neighboring camera) of the method according to embodiments of the invention.

The relative velocity of an object, utilized in both of the above two stages of reduction of the number of candidate images and the number of candidate objects, plays an important role in increasing the correct tracking rate of the method of the invention by reducing the number of the candidate objects. It may also be utilized as an additional object feature to help improving the correct tracking rate in the re-identification related steps.

FIGS. 1 to 4 illustrate embodiments of configuration of devices of the video-surveillance system.

FIG. 1 illustrates an example of a simplified video-surveillance system wherein embodiments of the invention can be implemented.

As illustrated, the simplified video-surveillance system 100 comprises a set of n video-surveillance cameras referenced 105-1 to 105-n (generically referenced 105). Each of the set of cameras 105 is configured to provide a corresponding video stream comprising a sequence of images to a video-surveillance center 110 and/or to provide data to the video-surveillance center 110, for example tracking data. The images and/or data are sent from the cameras 105 to the video-surveillance center 110 via a communication network 115.

The set of cameras 105 can be composed of several types of cameras such as digital internet protocol (IP) video cameras, analog video cameras, or a combination thereof. The invention is not limited to these types of cameras.

According to a particular embodiment, the cameras 105 are IP video cameras. Each of the IP cameras 105 is configured to encode its corresponding video stream and to transmit the encoded video stream to the video-surveillance center 110 via the communication network 115. According to another particular embodiment, the cameras 105 are analog cameras. Each of the analog cameras 105 is configured to generate an analog video stream and is associated with a conversion module that converts the generated analog video stream to a digital video stream. Each of the analog cameras 105 is configured to encode the digital video stream and to transmit the encoded video stream to the video-surveillance center 110 via the communication network 115.

For the sake of illustration, the video-surveillance center 110 comprises a Video Manager Server (VMS) 120 configured to manage the whole system (e.g. configuration, video routing, displaying, etc.), a storage server 125 utilized for storing video streams received from the cameras 105, a video analytics server 130 which implements a Video Content Analysis algorithm, and a display 135 that can be used to display videos received from the cameras 105.

As illustrated, the communication network 115 connects all the above-mentioned elements of the video-surveillance system 100, each of these elements comprising at least one communication module, either wired or wireless, configured to transmit data to and/or receive data from another element via the communication network 115.

Figure 2:
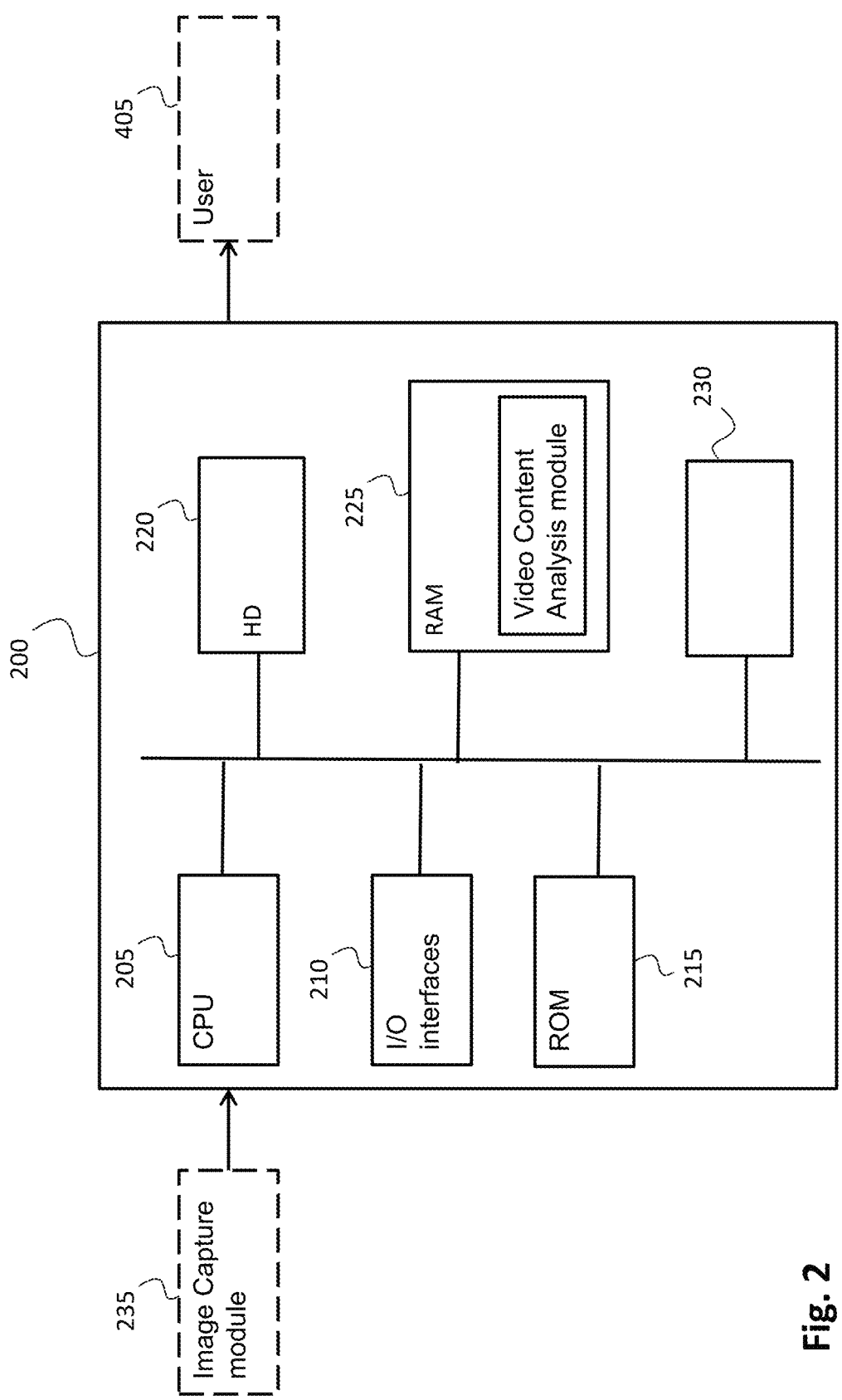
FIG. 2 is a block diagram illustrating an example of architecture for a computing device 200 wherein embodiments of the invention can be implemented.

FIG. 2 is a block diagram illustrating an example of architecture for a computing device 200 wherein embodiments of the invention can be implemented.

According to an embodiment of the invention, the video-surveillance center 110 comprises the computing device 200. According to another embodiment of the invention, at least one of the cameras 105 comprises the computing device 200.

As illustrated, the computing device 200 comprises a communication bus connected to at least the following elements:
- a central processing unit (CPU) 205, such as a microprocessor;
- an input/output (I/O) interface module 210 utilized for receiving data from and/or for sending data to external devices such as a video source or a display device;
- a read only memory (ROM) 215 utilized for storing computer programs, in particular computer programs for implementing embodiments of the invention;
- a hard disk (HD) 220;
- a random access memory (RAM) 225 utilized for storing executable instructions (executable code), in particular instructions performed to carry out steps according to embodiments of the invention during execution as well as registers, in particular registers adapted to record variables and parameters used to implement embodiments of the invention. In particular, RAM 225 may store instructions for carrying out object tracking, for example instructions of a Video Content Analysis algorithm; and
- a communication module 230 that is typically connected to a communication network over which digital data, in particular processed data or data to be processed, are transmitted or received.

For the sake of illustration, the read only memory 215 or the hard disk 220 can store information on the position of one or several cameras 105 as well as fields of view of this or these cameras 105.

Before being loaded into the RAM 225 to be executed, an executable code is preferably stored in the read only memory 215. Alternatively, it can be stored in the hard disk 220 or in a removable digital medium (not represented) such as a memory key, for example a memory key conforming to the USB (Universal Serial Bus) standard.

The central processing unit 205 is adapted to control and direct the execution of the instructions or portions of executable code of the program or programs according to embodiments of the invention, which instructions are stored in one of the aforementioned storage means such as the RAM 225, ROM 215 and HD 220. After powering on, the CPU 205 is capable of executing instructions received from the main RAM memory 225 relating to a software application after those instructions have been loaded from the ROM 215 or the hard-disk 220 for example.

As illustrated, the computing device 200 may be connected to an image capture module 235 comprising the cameras 105, for example one or several cameras 105 that provide sequences of images to the computing device 200, and to a user interface UI which receives and displays data sent by the computing device 200. Displayed data may correspond to results of a tracking algorithm according to embodiments of the invention.

FIG. 3, comprising FIGS. 3a to 3d, illustrates an example of acquisition of images of a same real scene 300 at four different time instants T0, T1, T2 and T3 using three different cameras 305-1, 305-2 and 305-3. Preferably, the cameras 305-1, 305-2 and 305-3 are configured so that their fields of view (FoV) 310-1, 310-2 and 310-3 do not overlap.

For the sake of illustration, it is assumed that the cameras 305-1, 305-2 and 305-3 of the video-surveillance system 100 are static and that their fields of view 310-1, 310-2 and 310-3 do not change over time.

The cameras 305-1, 305-2 and 305-3 are configured to acquire sequences of images representing the sub-scenes 310-1, 310-2 and 310-3 of the scene 300, respectively, as a function of the location of the cameras 305-1, 305-2 and 305-3 and of their fields of view 310-1, 310-2 and 310-3. The objects that are present in the sub-scene 310-1, 310-2 and 310-3 can be respectively tracked by each of the cameras 305-1, 305-2 and 305-3. FIGS. 3a to 3d respectively illustrate an example of the presence/absence of objects (each object being represented by a dot) in the real scene 300 at different time instants T0, T1, T2 and T3. FIG. 3a shows that at the time instant T0, objects appear evenly in the real scene 300 and may move in various directions. FIG. 3b shows that at the time instant T1, a sudden rise of the flow of objects occurs in the area 310-1 of the camera 305-1. FIGS. 3c and 3d illustrate respectively that at the time instants T1 and T2, a sudden rise of the flow of objects occurs respectively in the area 310-3 of the camera 305-3 and in the area 310-2 of the camera 305-2.

According to particular embodiments of the invention, at least one or several of the cameras 305-1, 305-2 and 305-3 are configured to perform a step of detecting one or a plurality of objects in an image acquired by the corresponding camera and counting the detected objects. The object detection is well-known in the art. According to an embodiment of the invention, the detected objects are counted by setting a virtual reference line in the image and counting a number of objects crossing this reference line.

For the sake of illustration, the examples provided in FIGS. 3a to 3d are utilized for illustrating the steps of a method for optimizing tracking of targets in images obtained from several cameras. Such steps are described by reference to FIG. 5.

Figure 4A:
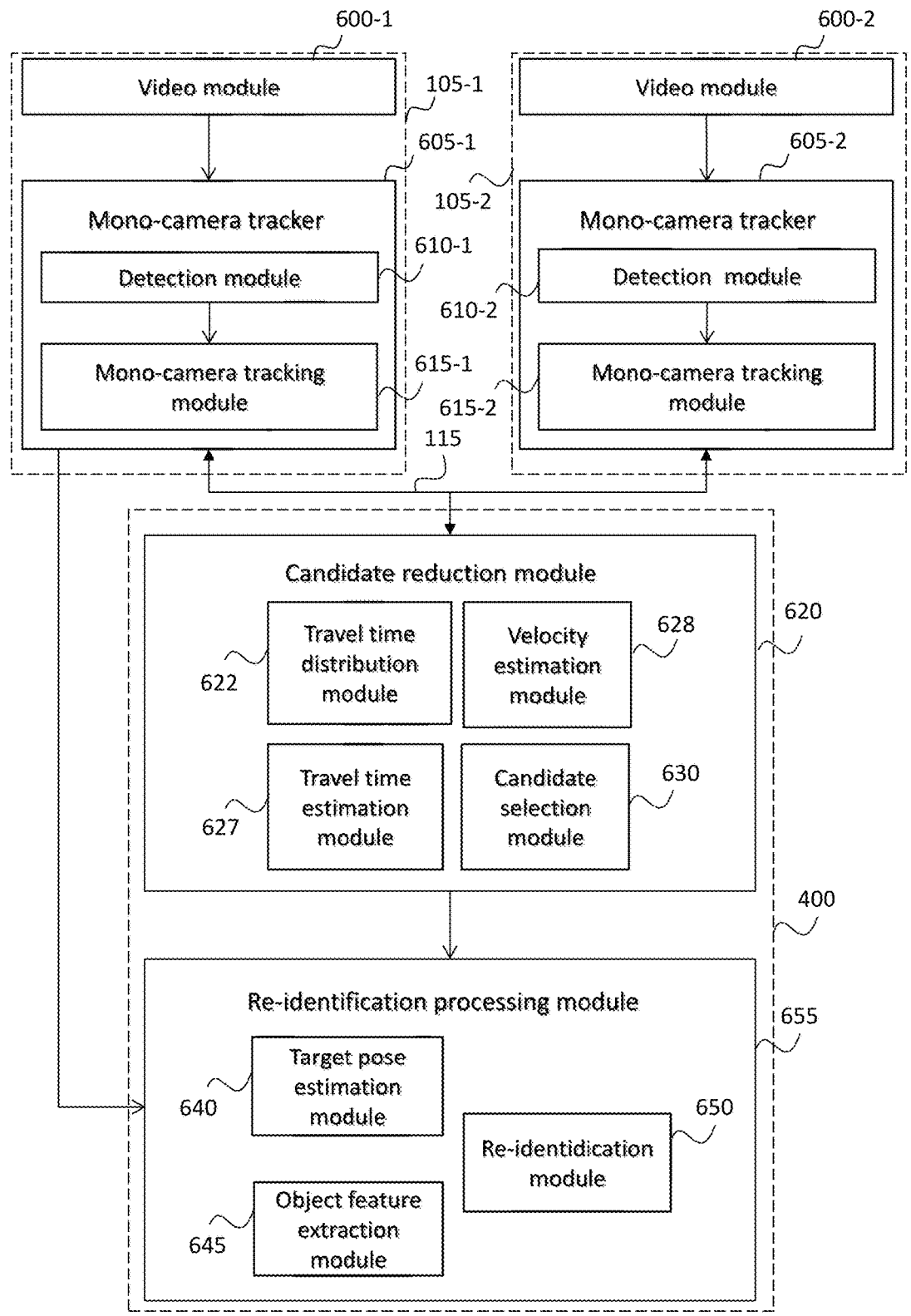
FIGS. 4a and 4b, represents examples of a schematic block diagram of a re-identification tracking system utilizing data processed by a plurality of mono-camera trackers.
Figure 4B:
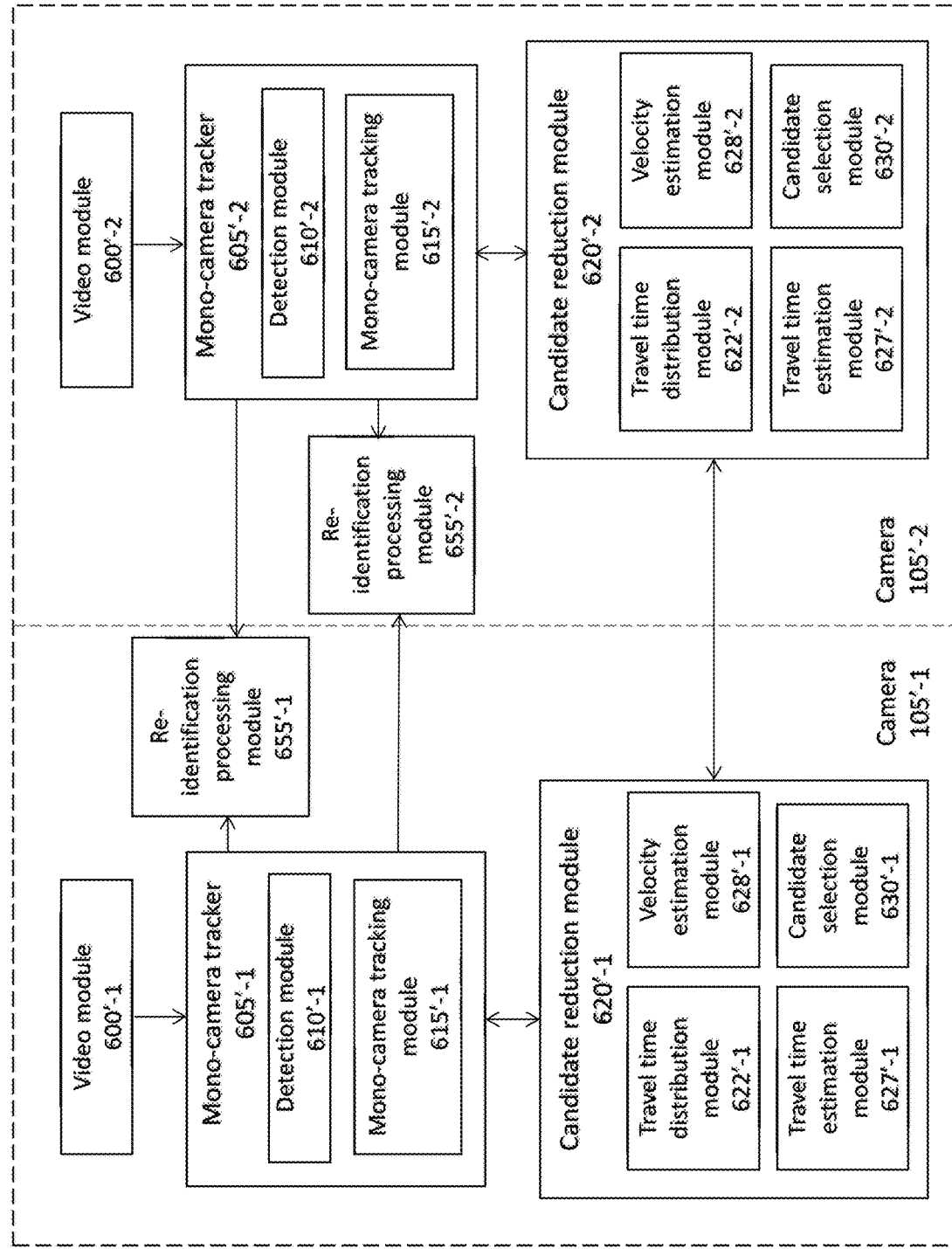

FIG. 4, comprising FIGS. 4a and 4b, represents examples of a schematic block diagram of a re-identification tracking system utilizing data processed by a plurality of mono-camera trackers.

More precisely, FIG. 4a is a schematic block diagram of a re-identification tracking system 400 using centralized processing means according to an embodiment of the invention. FIG. 4b is a schematic block diagram of a re-identification tracking system using distributed processing means according to another embodiment of the invention.

As illustrated in FIG. 4a, the re-identification tracking system 400 is connected via the communication network 115 to two cameras 105-1 and 105-2. The re-identification tracking system 400 comprises a candidate reduction module 620 and a re-identification processing module 655. The candidate reduction module 620 is configured to efficiently select eligible candidate objects to be processed by the re-identification processing module 655 to select from the eligible candidate objects a candidate object as the target object. The candidate reduction module 620 and the re-identification processing module 655 can be implemented as software, hardware, or a combination thereof by a central server such as the video manager server (e.g. the VMS 120 in FIG. 1) or by a dedicated server (e.g. the server 130 in FIG. 1).

For the sake of illustration, only two cameras 105-1 and 105-2 are illustrated in FIG. 4a. However, it should be understood that the re-identification tracking system 400 is applicable for more than two cameras of the video-surveillance system. As illustrated in the embodiment presented in FIG. 4a, each camera coupled to the re-identification tracking system 400 comprises a video module and a mono-camera tracker. For example, camera 105-1 comprises video module 600-1 and mono-camera tracker 605-1, and camera 105-2 comprises video module 600-2 and mono-camera tracker 605-2.

A main object of the video modules 600-1 and 600-2 is to receive sequences of images (or videos) that are typically provided by a local video sensor or by a remote device.

According to an embodiment, the video modules 600-1 and 600-2 are embedded within the cameras 105-1 and 105-2 along with the mono-camera trackers 605-1 and 605-2 (video module 600-1 and mono-camera tracker 605-1 being embedded in the camera 105-1 and the video module 600-2 and the mono-camera tracker 605-2 being embedded in the camera 105-2). Alternatively, the video modules 600-1 and 600-2 as well as the mono-camera trackers 605-1 and 605-2 belong to a remote device, typically a remote server. In this latter case, it can be either directly included in a video manager server (e.g. the VMS 120 in FIG. 1) by hosting dedicated software or in a dedicated server (e.g. the server 130 in FIG. 1) as software, hardware, or a combination thereof.

According to an embodiment, the mono-camera tracker 605-1 comprises a detection module 610-1 and a mono-tracking module 615-1. Similarly, the mono-camera tracker 605-2 comprises a detection module 610-2 and a mono-tracking module 615-2.

According to the given example of an embodiment of the invention, each of the detection modules 610-1 and 610-2 is configured to perform a standard detection algorithm utilized in a tracking-by-detection algorithm, and each of the mono-camera tracking module 615-1 and 615-2 is configured to perform a standard mono-camera tracking algorithm utilized in a tracking-by-detection algorithm.

The detection modules 610-1 and 610-2 may deliver bounding boxes (e.g. x-coordinate, y-coordinate, width, and height) and a corresponding detection score representing a level of confidence associated with each detected object (or person) in each image received from the video modules 600-1 and 600-2.

According to an embodiment, the candidate reduction module 620 comprises a travel time distribution module 622, a velocity estimation module 628, a travel time estimation module 627 and a candidate selection module 630.

The travel time distribution module 622 is configured to perform learning steps which provide beforehand, in a general case without needing to know which is the at least one target object to be tracked, an approximate value of travel time spent for moving from one camera to another camera of a pair of cameras of the video-surveillance system (described by reference to a step 510 of estimating the global travel time distribution in FIG. 5).

According to an embodiment, the travel time distribution module 622 is configured to generate, for each camera of the pair of cameras, an object density measurement (described by reference to steps 501 and 505 in FIG. 5) and estimate then the global travel time distribution based on the calculated object density measurements.

According to an embodiment, the velocity estimation module 628 is utilized to calculate, for each of the cameras, velocities of objects detected and tracked by the corresponding camera (e.g. the camera 105-1). According to an embodiment, a velocity of an object detected by the camera is calculated based on images obtained by the camera and containing a representation of the object.

According to an embodiment, the velocity estimation module 628 is used to generate, for each of the cameras, a velocity distribution based on the calculated velocities of objects detected by the camera.

According to an embodiment, the velocity estimation module 628 is also configured to estimate (at least implicitly), for each of the cameras, relative velocities of objects captured by the camera based on the velocity distribution associated with the camera (described by reference to steps 520 and 521 in FIG. 5).

For the sake of illustration, a relative velocity of an object may be a value representing a relation between the velocity of an object and a mean velocity of objects previously detected and tracked by the camera. Such a value may represent, for example, the "position" of the object velocity in a velocity distribution (e.g. the object velocity belongs to the 10% lowest velocities in the velocity distribution or the 10% greatest velocities in the velocity distribution of the velocities). In other words, such a "position" of a velocity in a velocity distribution represents a relative velocity.

According to an embodiment of the invention, the travel time estimation module 627 is utilized to estimate, based on the relative velocity of a target object estimated by the velocity estimation module 628 and the global travel time distribution generated by the travel time distribution module 622, a travel time of the target object moving from the camera (e.g. the camera 105-1) to another camera (e.g. the camera 105-2) of a pair of cameras (described by reference to a step 530 in FIG. 5).

According to an embodiment, the candidate selection module 630 is configured to select, based on the estimated travel time of the target object, candidate objects from all the objects detected by the other camera of the pair of cameras (described by reference to a step 540 in FIG. 5).

According to an embodiment, the candidate selection module 630 is further configured to compare the relative velocity of the target object detected by a camera (e.g. the camera 105-1) and the relative velocities of the candidate objects detected by another camera (e.g. the camera 105-2) of a pair of cameras (described by reference to a step 545 in FIG. 5) so as to select eligible candidate objects to be further processed.

According to the system illustrated in FIG. 4*a*, the re-identification processing module 655 is coupled to the candidate reduction module 620 and the mono-camera trackers 605-1 and 605-2. The re-identification processing module 655 comprises a target pose estimation module 640, an object feature extraction module 645 and a re-identification module 650.

The target pose estimation module 640 is used to determine, for an object detected by a camera, one or a plurality of obtained images (each of which comprising a sub-image defined by a bounding box) providing at least relatively sufficient object feature information to be extracted by the object feature extraction module 645.

It should be noted that reducing a number of candidate objects makes it possible to improve the efficiency of tracking objects by decreasing the risk of selecting a wrong candidate object during re-identification. Moreover, by reducing the number of candidate objects, the object feature extraction module 645 only extracts object features of the eligible candidate objects selected by the candidate reduction module 620 (described by reference to a step 550 in FIG. 5). In other words, the method according to embodiments of the invention comprises other steps (e.g. the steps 520, 521, 530, 540, 545) performed beforehand so as to reduce the number of (candidate) objects to be processed in the step 550 and thus, to increase the correct tracking rate.

According to embodiments of the invention, the extracted object features comprise image-based features (such as colours, textures and/or pixel-based information) which can be represented by one vector or by a set of vectors.

According to an embodiment, the re-identification module 650 is configured to select a candidate object based on the object features of the selected candidate objects and on the object features of the target object (described by reference to a step 560 in FIG. 5).

The object features of an object preferably comprise imaged-based features and a relative velocity of the object. Accordingly, the object features of the selected candidate objects comprise a relative velocity (obtained in step 521 of FIG. 5) and image-based features (extracted in step 550 in FIG. 5) and the object features of the target object comprise a relative velocity (obtained in step 520 in FIG. 5) and image-based features (extracted in step 550 in FIG. 5). Therefore, according to embodiments of the invention, re-identification step 560 is performed by adapting a standard re-identification algorithm by using a further feature in addition to the relative velocity of an object.

According to an embodiment, re-identification tracking system 400 further comprises a candidate database which is accessible by the cameras (e.g. 105-1 and 105-2) and by re-identification processing module 655. It may be configured to store the above-mentioned object features of objects. It should be noted that the embodiments of the invention are not limited to the presence or the structure of the candidate database. Preferably for each of the cameras of the video-surveillance system 100, the extracted object features of objects in images from the camera can be stored in a local storage device of the camera.

It should be noted that the invention is not limited to the previously mentioned embodiments with a centralized configuration as illustrated in FIG. 4a. According to other embodiments, the re-identification tracking system has a distributed configuration. More precisely, one or several of the modules 622, 628, 627, 630 of the candidate reduction module 620 and one or several of the modules 640, 645 and 650 of the re-identification processing module 655 are implemented as being respectively dedicated to the cameras.

FIG. 4b illustrates an embodiment of a re-identification tracking system using a distributed configuration. As illustrated, the candidate reduction module 620'-1 and the re-identification processing module 655'-1 are embedded within the camera 105'-1 and the candidate reduction module 620'-2 and the re-identification processing module 655'-2 are embedded within the camera 105'-2. For the sake of clarity, the modules illustrated in FIG. 4b that have the same reference numerals as the modules of FIG. 4a, with a prime, have a similar behaviour.

It should be noted that since the present invention can be implemented in software and thus can be embodied as computer readable code for provision to a programmable apparatus on any suitable carrier medium, the invention is not limited to the above embodiment of configuration of devices of the video-surveillance system. Other configurations and/or devices able to perform the steps of the method according to embodiments of the invention can be implemented.

Figure 5:
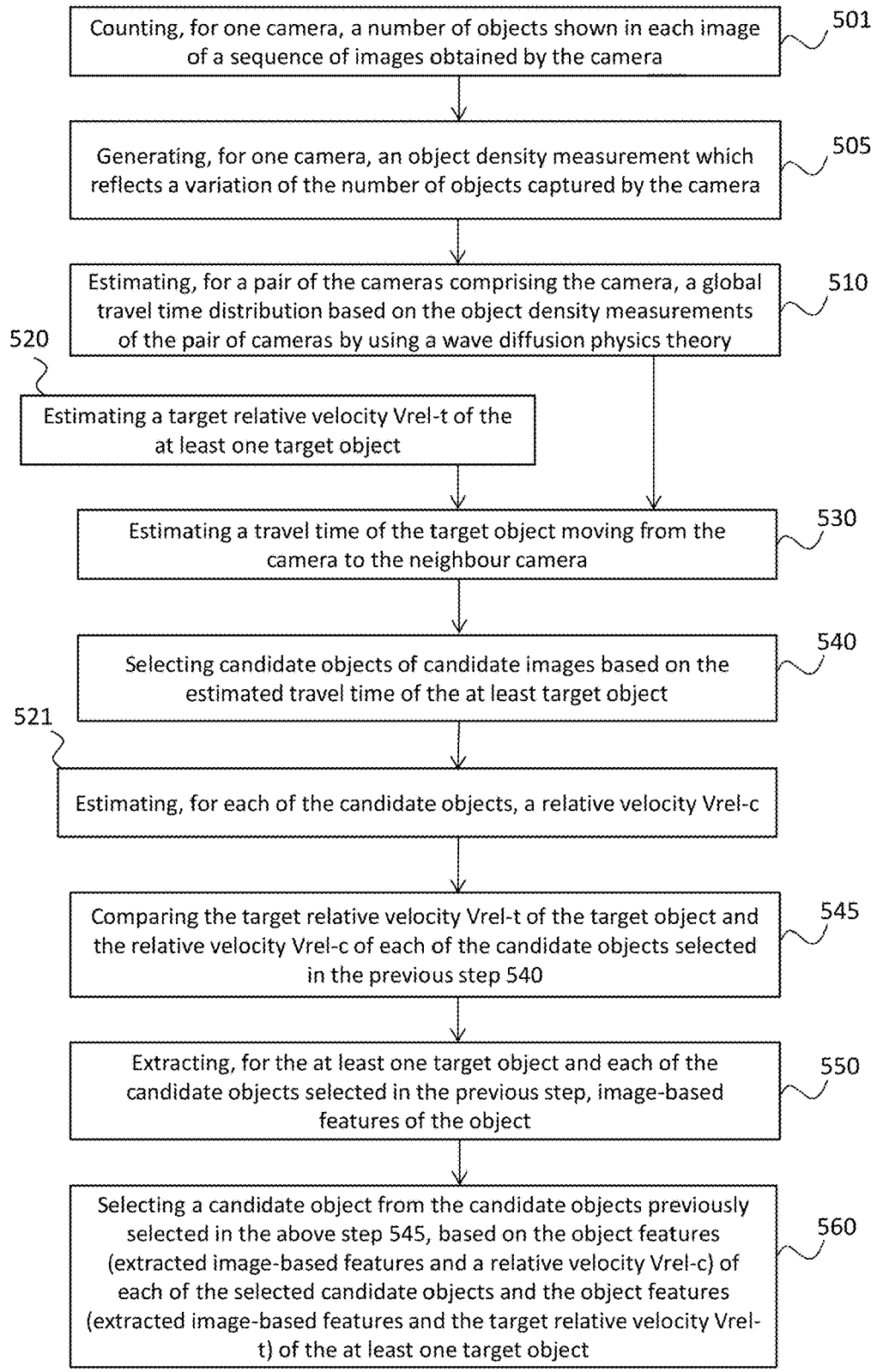
FIG. 5 is a flowchart illustrating steps of a method for optimizing tracking of at least one target object in images obtained from at least two cameras of a video-surveillance system of which the fields of view (FoV) do not overlap.

A flowchart is provided in FIG. 5 for illustrating the steps 501 to 560 of an example of the method for optimizing tracking of at least one target object in images obtained from at least two image sources such as the cameras 305-1, 305-2 and 305-3 of the video-surveillance system 100 according to embodiments of the invention.

The steps 501 to 560 of the method according to embodiments of the invention can be viewed as the following three components working in synergy so as to increase the correct tracking rate and to reduce computation spent to compare extracted object image-based features of the at least one target captured by a camera (e.g. camera 305-1), with those of objects in images obtained from each of the other cameras of the video-surveillance system:

- a component for estimating a global travel time distribution (steps 501, 505 and 510): this component comprises learning steps which provide beforehand, in a general case without need of knowing which is the at least one target object to be tracked, an approximate value of travel time from one camera to another camera of the video-surveillance system;
- a component for estimating a travel time of the at least one target object based on a relative velocity of the at least one target object (steps 520, 530): it comprises calculating and applying information particularly about the at least one target (as "relative velocity" of objects) to the above-mentioned estimated global travel time diffusion, so as to estimate more precisely when the target object shown in at least one of the images obtained from one camera of the video-surveillance system (such as the camera 305-1) may possibly arrive at the field of view of one of the others cameras (such as the cameras 305-2 and 305-3) of the video-surveillance system. The relative velocity of an object can be considered as a signature comprising information particularly about the object without being affected by changes of environment (which will be explained in the following paragraphs) and thus helps reduce further the number of candidate images and candidate objects to be processed; and
- a component for determining, by utilizing criteria such as an "estimated travel time" and a "relative velocity", candidate objects configured to be further processed in the re-identification related steps in order to identify the at least one target object (steps 520, 521, 540, 545): it comprises determining if the relative velocity of a candidate object previously identified (in the step 540) is substantially equal to a target relative velocity (denoted hereafter as "Vrel-t") of the at least one target object, which allows to select eligible candidate objects to be further processed in the re-identification related steps such as extracting and comparing image-based features of the target object captured by a camera with those of selected candidate objects captured by another camera.

The above three components aim at reducing a number of candidate images and candidate objects to be processed in the re-identification related steps. For example, the number of candidate objects may be able to be reduced from 1000 to 100 by removing 900 wrong candidate objects which have, compared to the target object, a very different travel time and/or a very different relative velocity. The removal of the wrong candidate objects results in increasing the correct tracking rate by reducing the risk of selecting a wrong candidate object.

In addition, since the number of candidate objects to be processed is reduced, the processing resources and the processing time for carrying out the re-identification steps are considerably reduced. The system efficiency is thus greatly improved.

The steps 501 to 560 of the method according to embodiments of the invention will be described in detail with examples provided in the following paragraphs.

According to particular embodiments, for each of the cameras 305-1, 305-2 and 305-3, a travel time distribution module (which is for example structurally and functionally similar to the above-mentioned travel time distribution module 622) performs firstly a step 501 of counting objects (e.g. people) shown in each image of a sequence of images obtained by the corresponding camera (e.g. the camera 305-1, 305-2 or 305-3) to obtain a number of the objects shown in the image. According to particular embodiments of the invention, the step 501 is performed to count the total number of objects shown in each image of the sequence of images.

The step 501 of counting is simple and fast to perform while only very few or even zero errors are generated.

For each of the cameras 305-1, 305-2 or 305-3, the travel time distribution module 622 performs then a step 505 of generating an object density measurement which reflects a variation of the number of objects captured by the corresponding camera during a period of time in which the sequence of images is obtained by the corresponding camera. The step 505 is performed based on the numbers of objects counted in the step 501 for the sequence of images of the corresponding camera.

The step 501 of counting the number of the objects shown in the obtained images is simple and constitutes a solid base to, on one hand, calculate a mean travel time of the objects moving from the area of one of a pair of cameras (e.g. the camera 305-1) to the area of one of the other camera of the pair of cameras (e.g. the camera 305-2 or 305-3), and on the other hand, to estimate a global travel time distribution and to evaluate precisely the evolution of object densities as described in a following step 510.

FIGS. 6a and 6b illustrate respectively an object density measurement for the cameras 305-1 and 305-3 of the example of the real scene 300 as shown in FIGS. 3a to 3d observed between the time instants T0 and T3. The horizontal axis of each of FIGS. 6a and 6b represents the elapsed time, and the vertical axis of each of FIGS. 6a and 6b represents the object density.

At the time instant T0 (as shown in FIG. 3a), objects appear evenly in the real scene 300 and may move in various directions. At the time instant T1 (as shown in FIG. 3b), a sudden rise of the flow of objects occurs in the area 310-1 of the camera 305-1, which is indicated by the object density measurement of the camera 305-1 (see left-hand vertical line of FIG. 6a). Another rise of a flow of objects occurs at the time instant T2 (as shown in FIG. 3c) in the area 310-3 of the camera 305-3, which is indicated by the object density measurement of the camera 305-3 (see a right-hand vertical line of FIG. 6b).

FIGS. 6c and 6d illustrate respectively an object density measurement for the cameras 305-1 and 305-2 between the time instants T0 to T3. The horizontal axis of each of FIGS. 6c and 6d represents the elapsed time and the corresponding vertical axis represents respectively the object density. FIG. 6c which is same to FIG. 6a is provided for a comparison with FIG. 6d for ease of comprehension.

At the time instant T1 (as shown in FIG. 3b), a sudden rise of the flow of objects occurs in the area 310-1 of the camera 305-1, which is indicated by the object density measurement of the camera 305-1 (see left-hand vertical line of FIG. 6c). Another rise of a flow of objects occurs at the time instant T3 (as shown in FIG. 3d) in the area 310-2 of the camera 305-2, which is indicated by the object density measurement of the camera 305-2 (see a right-hand vertical line of FIG. 6d).

Then, for a pair of cameras (such as the cameras 305-1 and 305-3), a step 510 of estimating a global travel time distribution for an object moving from one to the other of the pair of cameras, is performed by a travel time estimation module, based on the object density measurements for both cameras (in the step 505). The travel time distribution module is for instance structurally and functionally similar to the above-mentioned travel time distribution module 622.

According to a first example, step 510 may comprise a step of centring a predetermined Gaussian distribution in view of measurements. The Gaussian distribution may have a predetermined variance. Alternatively, the variance may be determined as a function of measurements.

According to a second example, step 510 may be performed by using diffusion theories such as the wave diffusion physics theory, or even sound reverberation-like equations. For example, equations deriving movements of colloidal suspensions in a force potential may be used, with Brownian movement components introducing a time-dependent variance which can be considered to be similar as the variance introduced by a mean velocity distribution. Alternatively, step 510 may be based on colloidal suspensions comprising particles (i.e. objects) with a continuous distribution of masses and no Brownian movement since in that case, a mean velocity distribution depends on the masses.

In both cases, an additional variance in density which depends on the time (as being the case for velocities-induced additional variance in density) can be obtained, and is closely related to the random velocity in the case of Brownian movement, or the mean velocities according to embodiments of the invention.

Therefore, an approximate of the mean velocity distribution can be obtained by measuring the evolution of a variance which softens sharp density peaks (as randomly observed).

Simulations taking into account all cameras of the video-surveillance system may give more accurate results by taking into account densities as measured by all cameras. One of the advantages of applying the wave diffusion physics theory is that it has been found that the moving of the objects or people has some similarities with the diffusion of particles with different velocities. In a particle diffusion case, a distribution of the mean velocities of the particles can be generated by deriving the particle density curves at different times and different points. Such principle can also be applied to the estimation of the global travel time distribution.

Similarly, such estimation may be based on modelling performed in other physical domains which use diffusion-like effects. For example, sound propagation in a closed room is characterized by reverberation effects, which is very similar to velocity-driven distribution when looking at step response of reverberation. Retrieving the reverberation characteristics of a room by using sound source recordings is commonly done. It presents some similarities with retrieving the velocity distribution curves by using target density recordings.

Turing back to FIG. 5 and taking the pair of cameras 305-1 and 305-3 as an example, the step 510 is performed in order to estimate a global travel time distribution of the objects moving from the area 310-1 associated with the camera 305-1 to the area 310-3 associated with the camera 305-3. It is based on the results of steps 501 and 505 (these results being generated and received from the travel time distribution module). According to particular but non-limitative embodiments, a mean travel time of the objects moving from the area 310-1 to the area 310-3 can be also calculated based on the results of the steps 501 and 505.

Figure 7A:
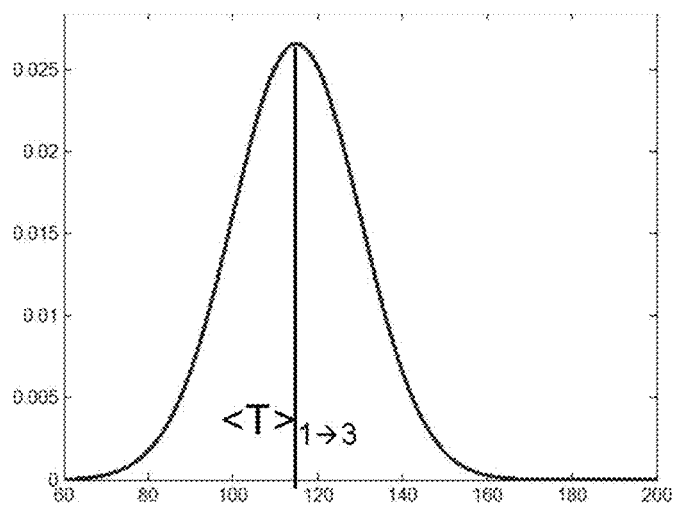
FIGS. 7a and 7b, illustrates global travel time distributions obtained based on the object density measurements as indicated in FIGS. 6a and 6b and as indicated in FIGS. 6c and 6d, respectively.

FIG. 7*a* illustrates a global travel time distribution obtained in the step 510 by using the object density measurements for the cameras 305-1 and 305-3 as described in reference to FIGS. 6*a* and 6*b*. The horizontal axis of FIG. 7*a* represents the travel time, and the vertical axis of FIG. 7*a* represents the probability density of objects. The global travel time distribution shown in FIG. 7*a* indicates a range of travel time (Δt) of the objects moving from the area 310-1 to the area 310-3 is between 60 and 170 seconds, with a mean travel time being 115 seconds as indicated by a vertical line of FIG. 7*a*.

Figure 7B:
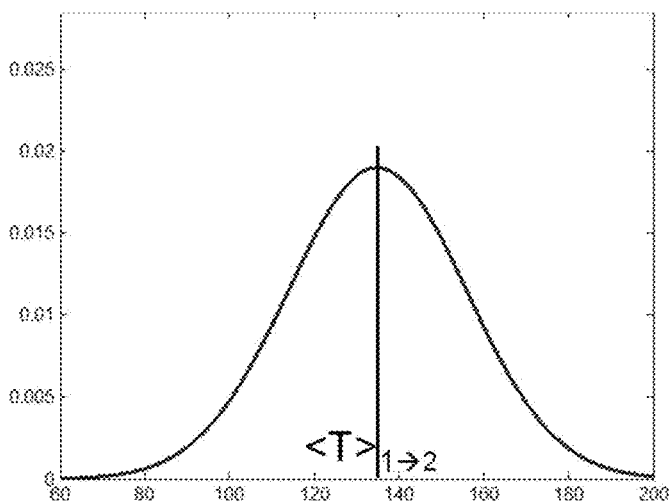

Similarly, FIG. 7*b* illustrates a global travel time distribution of the objects moving from the area 310-1 of the camera 305-1 to the area 310-2 of the camera 305-2, obtained by using the object density measurements for the cameras 305-1 and 305-2 as described by reference to FIGS. 6*c* and 6*d*. According to the global travel time distribution shown in FIG. 7*b*, the range of travel time (Δt) of the objects moving from the area 310-1 to the area 310-3 is between 70 and 200 seconds, with a mean travel time being 136 seconds as indicated by a vertical line of FIG. 7*b*.

For each pair of the pairs of cameras such as "305-1, 305-3" and "305-1, 305-2", the global travel time distribution gives the range of travel time (Δt) the objects spend when moving from one of the pair of cameras to the other of the pair of cameras, which corresponds thus to the fraction of objects as a function of the mean travel time.

Turning back to FIG. 5, it is to be noted that the step 510 of estimating a global travel time distribution is performed completely automatically based on the travel time statistics automatically retrieved in the step 501. The counting step 501 providing a precise and correct number of objects shown in the obtained images allows thus to reduce the measurement uncertainty of the step 510, especially when averaging over many sampled objects shown in the images obtained from the cameras.

In order to improve the accuracy of the global travel distribution estimation, for example to get a more accurate range of travel time (Δt), one or a plurality of long video streams of, for example several days long, can be utilized to enhance the data reliability and reduce the measurement uncertainty.

The above steps 501, 505 and 510 are learning steps which can be performed offline or in real-time.

In order to increase the system efficiency and the system reliability of the video-surveillance system, sequences of images of long video streams can be utilized as data sources and the steps 501, 505 and 510 are performed preferable offline.

As mentioned above, the global travel time distribution obtained in step 510 provides a probability of travel time as observed over a wide range of objects (i.e. it is not a probability of travel time for a particular object, but for a whole set of objects detected over a given period of time). It may be used directly to estimate a range of travel time (Δt) spent by an object moving from one camera to one of the neighboring cameras. By doing so, it is assumed that an individual travel time distribution for one object is close to the distribution for the whole set of objects. This provides a rough range of travel time (Δt).

This rough range travel time (Δt) can then be refined by calculations using information about the individual objects which vary from an object of the set of objects to another. This is possible by performing the step 530 so as to estimate a travel time of the target object moving from one camera to one the neighboring cameras.

It is noted that the wider the range of travel time (Δt) is, the greater the number of candidate images and/or that of candidate objects are. Therefore, the steps 501, 505, 510, 520 and 530 of the method are advantageously performed to refine the range of travel time (Δt). An example of the difference between the rough range (Δt) of travel time of the global travel time distribution (obtained in the step 510) and the estimated travel time of the target object (obtained in the step 530) is illustrated in FIGS. 8*a* to 8*d*.

FIG. 8, comprising FIGS. 8*a* to 8*d*, illustrates respectively an example of different ranges of travel time (Δt) of at least one target object moving from the camera 305-1 to the camera 305-2 which are obtained by performing different estimations of travel time (Δt). For the sake of illustration, such a target object is denoted 731 in FIGS. 8*a*-8*d*. For each of the FIGS. 8*a*-8*d*, the horizontal axis represents the elapsed travel time (e.g. in seconds), and the vertical axis represents the probability density of objects. As can be derived from FIG. 8*a*, an example of a real travel time spent by target object 731 for moving from camera 305-1 to camera 305-2 is 135 seconds.

As mentioned above, when tracking a specific object in images obtained from one camera of the video-surveillance system (such as the camera 305-1), all images obtained at all time instants from each of the other cameras (e.g. the cameras 305-2 and camera 305-3) are to be considered as candidate images to be processed to identify in which one of the candidate images the at least one target object is present. More precisely, all objects of all of the candidate images are considered as candidate objects to be processed in order to select the at least one target object from the candidate objects. This is very disadvantageous since the risk of wrongly selecting a candidate object increases with the number of candidate objects.

Figure 8A:
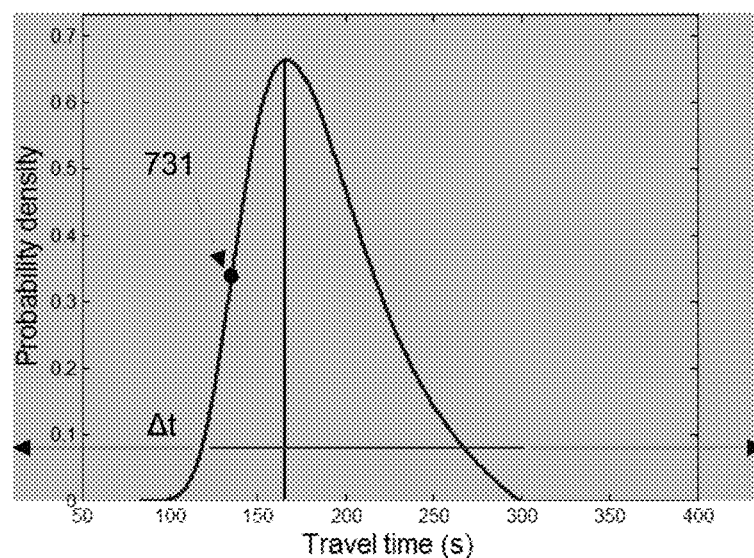
FIGS. 8a to 8d, illustrates different estimations of travel time ($\Delta t$) of the at least one target object moving from one camera to a neighboring camera.

FIG. 8*a* illustrates the above case according to which no travel time estimation is performed to estimate the travel time (Δt) of the at least one target object and no selection of candidate objects is performed. As a consequence, the travel time (Δt) as shown in FIG. 8*a* is a range starting from 0 second without having an upper bound, which leads to consider all objects of all of the candidate images as candidate objects.

To increase the correct tracking rate, the number of candidate objects should be decreased. To that end, it is thus useful to estimate a travel time (Δt) of the considered target object (e.g. target object 731), detected by one camera (e.g. camera 305-1), to arrive in the field of view of the other cameras (e.g. cameras 305-2 and 305-3).

The estimated travel time (Δt) is used to determine a time period during which the target object should arrive in the area associated with the considered camera. This makes it possible to select only the images obtained during this time period as candidate images to be processed to identify the possible presence of the target object. Since it is no longer the case that all candidate objects of all candidate images obtained from the camera at all time instants need to be processed, the number of candidate images of the camera as well as that of candidate objects, which are roughly proportional to the estimated travel time (Δt), can thus be reduced. This results in improving the tracking efficiency by decreasing the number of possible candidate objects (and thus, the risk of wrongly selecting a candidate object).

Figure 8B:
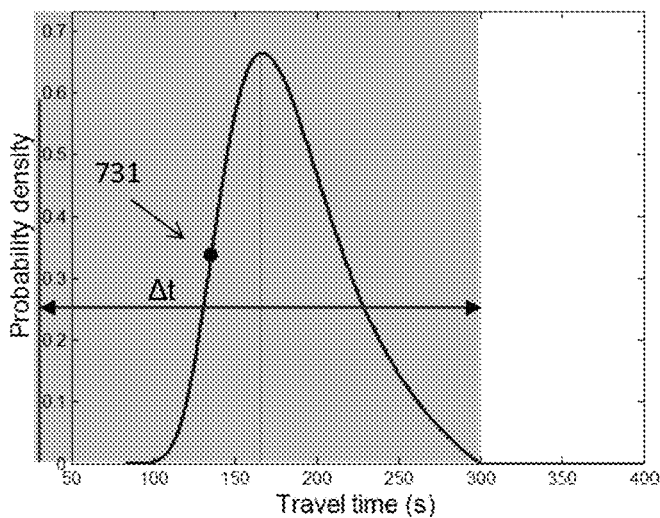

FIG. 8*b* illustrates an embodiment of estimating the travel time (Δt) of the target object based on the mean travel time (obtained in step 510) and an arbitrary uncertainty which can be assigned by a user. Said mean travel time obtained in the above step 510 indicates that in a general case, objects move from the area 310-1 of the camera 305-1 to the area 310-1 of the camera 305-1 to the area 310-2 of the camera 305-2 in a mean time of 165 seconds (as indicated by the middle vertical line of FIG. 8b). An arbitrary uncertainty variable is then applied to determine a lower bound and an upper bound of the travel time ($\Delta t$). As the example given in FIG. 8b, the lower bound of the travel time ($\Delta t$) is 0 second and the upper bound is 300 seconds. In another example with said mean travel time but with a different value of the arbitrary uncertainty variable, the range of the travel time ($\Delta t$) is between 75 seconds and 275 seconds.

Accordingly, all the images obtained from the considered camera before the lower bound and all the images obtained from this camera after the upper bound are not to be considered for selecting a candidate object.

Figure 8C:
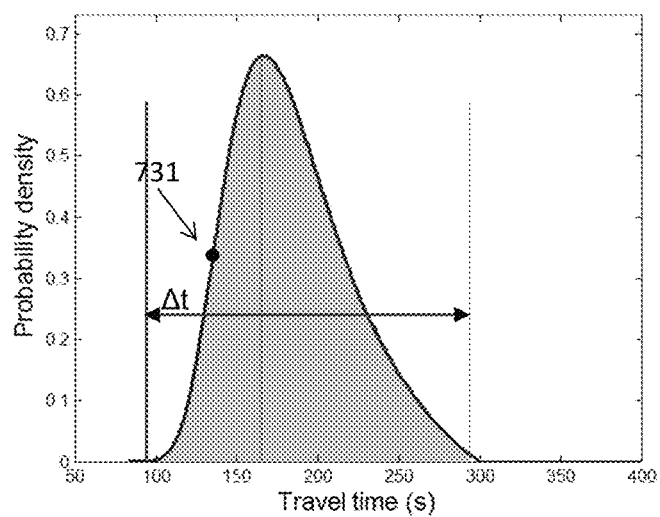

FIG. 8c illustrates a particular embodiment of estimating the travel time ($\Delta t$) of the target object based on the global travel time distribution obtained in the above step 501. The global travel time distribution obtained in the above step 510 provides a more precise range of travel time ($\Delta t$) that objects may spend when moving from the area 310-1 of the camera 305-1 to that of the camera 305-2. As indicated in FIG. 8c, the range of the travel time ($\Delta t$) is between 100 seconds and 300 seconds.

It should be noted that compared to the estimation of the travel time ($\Delta t$) based on the mean time and the arbitrary uncertainty (as illustrated in FIG. 8b), the estimation of the travel time ($\Delta t$) by utilizing the global travel time distribution (as illustrated in FIG. 8c) makes it possible to determine more precisely which images obtained from a camera such as the camera 305-2 are the proper candidate images and thus to reduce the number of candidate images as well as that of candidate objects. The system efficiency and accuracy can thus be further improved.

However, the travel time ($\Delta t$) determined based on the global travel time distribution obtained in the step 510 is still a wide range which provides only a general idea about how fast or how slow an object could be and/or or an average time that the object takes when moving from one camera (e.g. the camera 305-1) to one of the other cameras (e.g. the camera 305-2 or 305-3). It is to be noted here, that the global travel time distribution does not comprise information specifically directed to the target object to be tracked.

Taking FIG. 8c as an example, the estimated travel time ($\Delta t$) based on the global travel time distribution is between 100 seconds and 300 seconds while the real travel time of the target object moving from the area 310-1 of the camera 305-1 to the area 310-2 of the camera 305-2 is 135 seconds.

Figure 8D:
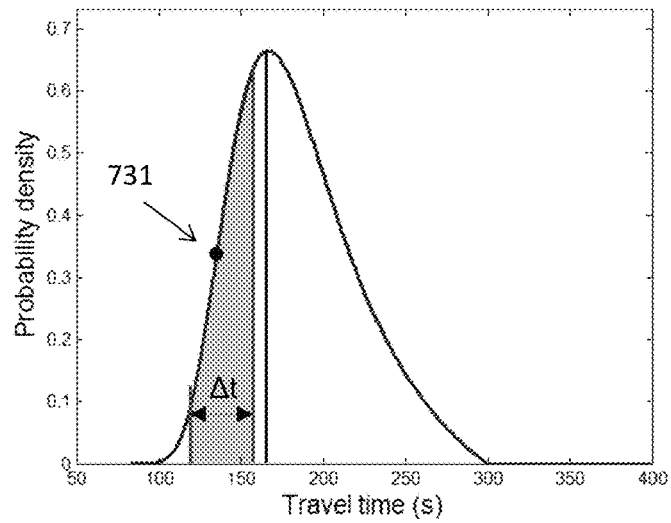

Therefore, in order to narrow the range of the estimated travel time ($\Delta t$) of the target object (as illustrated in FIG. 8d which is described later in detail in the following paragraphs) and to make the upper and lower bounds of the travel time ($\Delta t$) closer to the real travel time of the target object, the method according to embodiments of the invention comprises further a step 520 of estimating a target relative velocity (Vrel-t) of the target object captured by a camera (e.g. the camera 305-1). The target object may move from the field of view of a camera for example the camera 305-1 to that of a neighboring camera. The estimated target relative velocity (Vrel-t) of the target object obtained in the above step 520 comprises information particularly about the target object and is thus utilized in a later step 530 (which will be illustrated in the following paragraphs) to narrow the range of the estimated travel time ($\Delta t$) provided by the global travel time distribution obtained in the above step 510. For example, as illustrated in FIG. 8d, the estimated travel time ($\Delta t$) of the target object has a range between 120 seconds and 158 seconds, which is smaller than the range between 100 seconds and 300 seconds obtained only based on the global travel time distribution.

As described above, the relative velocity of a target object merely corresponds to a measurement of a velocity of the target object as compared to velocities of other objects detected by the same camera. Therefore, it can be known that the target object is "fast" or "slow" compared to other objects detected on that camera.

Objects detected as being fast objects by one camera tend to be fast objects from the point of view of other cameras and between cameras. By determining how fast is moving the target object in comparison to the other objects, one can refine the range ($\Delta t$) of the travel time distribution to be considered. Indeed, if the target object is moving fast in comparison to the other objects, the travel time is to be selected among the smallest ones in the travel time distribution. Conversely, if the target object is moving slowly in comparison to the other objects, the travel time is to be selected among the greatest ones in the travel time distribution. Intermediate range values can be determined accordingly.

In other words, knowing how fast is moving the target object in comparison to other objects makes it possible to locate the target object on a velocity distribution curve. For example, if the target object is at 10% mark of fastest objects, it should be at 10% fastest velocity in velocity distribution curve.

One of the reasons to generate and use the relative velocity of an object is that it has been observed that compared to the velocity, the relative velocity of the object depends considerably more on individual characteristics of the object and less on the nature of path such as the slope, the texture of the path or the presence of crowds or stairs, etc. In other words, compared to the velocity, the relative velocity of an object contains distinguishing information about the object and can thus be considered as an individual signature of the object. Moreover, the relative velocity of an object is camera-independent, which means in a general case, whether the object is detected by which camera, the relative velocity of the object remains substantially the same.

In addition, compared to other features such as image-based features, the relative velocity calculation is robust since the calculation of the relative velocity of an object is not affected by image artifacts which may be generated and shown in images captured by a camera due to the change of lighting, pose, colorimetry or even simply due to the hardware or software adjustment of cameras.

Figure 9:
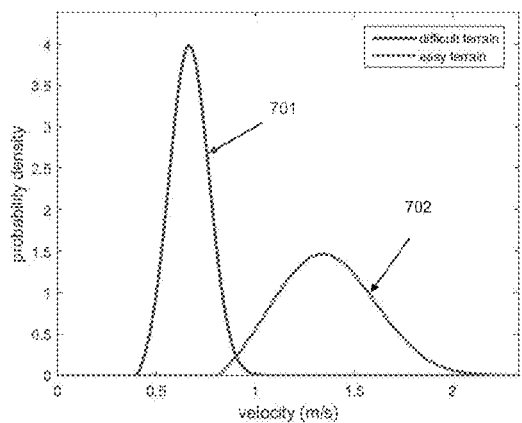
FIG. 9 illustrates examples of velocity distributions of a plurality of objects tracked by a video-surveillance system.

FIG. 9 illustrates an example of two curves denoted 701 and 702 respectively representing velocity distributions of a plurality of people (as objects tracked by the video-surveillance system) when they move on a difficult path and an easy path. The horizontal axis of FIG. 9 represents the velocity (in meters per second for the sake of illustration), and the vertical axis of FIG. 9 represents the probability density of objects.

The curve 701 indicates that the absolute velocities of the plurality of people are in a range between 0.4 m/s and 1 m/s, which is clearly narrower than a range indicated by the curve 702 which is between 0.8 m/s and 2.1 m/s. The curves 701 and 702 illustrate thus that the velocity of a person depends more on the nature of path than on individual characteristics.

It is observed here that the velocity of a target object may be easily derived from its trajectory as determined by the associated mono-camera tracker.

Figure 10:
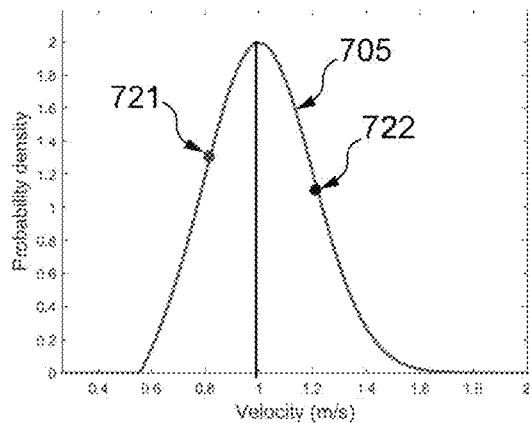
FIG. 10 illustrates an example of a velocity distribution of a plurality of objects.

FIG. 10 illustrates a velocity distribution (curve 705) of a plurality of objects (e.g. people). For the sake of illustration, the velocities of two objects denoted 721 and 722 are represented. The horizontal axis of FIG. 10 represents the velocity (again, in meters per second for the sake of illustration), and the vertical axis of FIG. 10 represents the probability density of objects.

As shown in FIG. 10, a velocity of the object 721 is estimated to be 0.8 m/s, smaller than a mean velocity value of the velocity distribution being equal to 1 m/s (as indicated by the middle vertical line of FIG. 10). In other words, the object 721 moves slower than the average of the objects.

The velocity of the object 722 is estimated to be 1.2 m/s which is greater than the mean velocity value and indicates thus that the object 722 moves faster than the average of the objects and accordingly faster than the object 721.

Therefore, as mentioned above, the relative velocity of an object contains indeed the information particularly about the object and can thus be considered as an individual signature of the object to indicate how "fast" or "slow" the object moves compared to the average velocity.

According to an embodiment of the invention, the step 520 of estimating a relative velocity of the at least one target object among a plurality of objects shown in a plurality of image obtained from a camera (e.g. the camera 305-1) can be performed by a velocity estimation module. The velocity estimation module is for instance structurally and functionally similar to the above-mentioned velocity estimation modules 628.

According to an embodiment of the invention, the velocity estimation module of the re-identification tracking system 400 is coupled to the mono-camera trackers and the travel time estimation module. It is configured to estimate a velocity distribution of objects detected by each camera by using object trajectories provided by the mono-camera tracker associated with the corresponding camera.

According to an embodiment of the invention, this step of calculating a velocity distribution can be performed off-line during training steps or in real-time.

Alternatively, a "sliding window" can be used for determining a velocity distribution (for each or some of the cameras) to take into account adverse effects such as crowd and rain or other environmental factors.

The velocity estimation module 628 calculates then the target relative velocity (Vrel-t) of the target object. This can be done by dividing the velocity of the target object by a mean value of the velocities.

Preferably, the target relative velocity (Vrel-t) of the target object is determined, in view of the detection of this target object by one camera, by estimating a "position" of the velocity of the target object in the velocity distribution associated with the considered camera. For example, the target relative velocity (Vrel-t) of the target object may be an indication according to which the velocity of the target object belongs to the 10% lower velocities (as defined in the velocity distribution).

Turing back to FIG. 5, based on the data received from the velocity estimation module such as the estimated target relative velocity (Vrel-t) of the target object and the data previously generated by the travel time distribution module such as the global travel time distribution obtained in the step 510, the travel time estimation module 627 then performs the step 530 of estimating the travel time (Δt) of the target object.

For the sake of illustration, the travel time (Δt) of the target object may represent the travel time range for the target object to move from the area 310-1 to the area 310-2. The travel time estimation module is for instance structurally and functionally similar to the above-mentioned travel time estimation module 627. An example of performing the step 530 to estimate the travel time (Δt) of the target object is illustrated in FIG. 8d.

As mentioned above, the target relative velocity (Vrel-t) provides information particularly related to the target object to indicate (in the particular example provided in FIG. 8d) how fast the target object moves in comparison to other objects detected by the considered camera. According to a particular embodiment, the target relative velocity comprises a "position" of the velocity of the target object in the velocity distribution. For example, if a target object is at 10% mark of fastest objects, it should be at 10% fastest velocity in the velocity distribution curve.

By using the relative velocity of the target object, it is possible to estimate the travel time (Δt) of the target object. For example, using the "position" of the velocity of the target object in the velocity distribution, it is possible to determine a "position" in the travel time distribution, from which the travel time (Δt) of the target object can be derived.

For example, if a target object is located at 10% fastest velocity in velocity distribution curve, it can be determined that it is at 10% smallest travel time in the travel time distribution curve.

It is thus possible to estimate the travel time (Δt) of the target object as illustrated in FIG. 8d.

More generally, according to particular embodiments of the invention, the estimated travel time (Δt) of the target object is obtained as a function of the relative velocity (Vrel-t) of the target object obtained in the above step 520 and of the global travel time distribution obtained in the above step 510.

Still according to particular embodiments, the estimated travel time (Δt) of the target object is adjusted by using adjustment parameters such as an uncertainty value related to measurements, an arbitrary margin of error which depends on joint accuracies of the velocity distribution measurement and the relative velocity estimation and/or an intrinsic uncertainty (e.g. natural velocity randomness of objects). Therefore, it can be more certain that the estimated travel time (Δt) of the target object is an appropriate approximation which covers possible travel times which the target object may spend.

Figure 11:
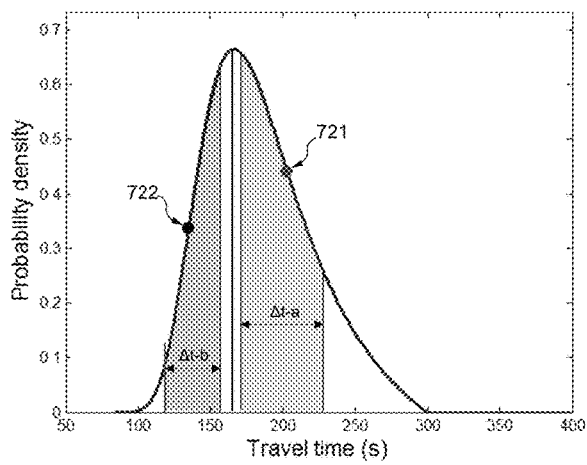
FIG. 11 illustrates an example of estimating travel times of objects based on a global travel time distribution and velocities of the objects.

FIG. 11 illustrates another example of estimating travel times of the two objects 721 and 722 of FIG. 10 based on a global travel time distribution (obtained in the above step 510) and relative velocities of the two objects 721 and 722. The horizontal axis of FIG. 11 represents the travel time (i.e. the elapsed time from the time at which the target object leaves the field of view of the camera and moves away from the camera), and the vertical axis of FIG. 11 represents the probability density of objects.

According to particular embodiments of the invention, the relative velocity of the object 721 is applied in an inversely proportional way to the global travel time distribution. This makes it possible to determine the range of the travel time of the object 721 that is comprised, for the sake of illustration, between 170 seconds and 230 seconds when using adjustment parameters such as a margin of error and/or an arbitrary uncertainty (e.g. the above-mentioned natural velocity randomness of objects).

Similarly, the relative velocity of the object 722 is applied, in an inversely proportional way, to the global travel time distribution, so as to generate a range of travel time of the object 722 as illustrated in FIG. 11.

Referring back to FIG. 8*d*, the range of the travel time (Δt) of the target object is determined, similarly to the way mentioned above, for example as a function of the global travel time distribution and of the relative velocity (Vrel-t) of the target object. The refined travel time (Δt) based on the target relative velocity (Vrel-t) of the target object is thus much narrower than the range of the travel time (Δt) estimated only on the basis of the global travel time distribution (as illustrated in FIG. 8*c*). Given an example in which the time instant at which the target object is captured by the camera 305-1 is 15:00:00 (hour:minute:second), the target object may arrive at the camera 305-2 during a later time period comprising between 15:02:00 and 15:02:38. For each of the neighboring cameras, the corresponding later time period is determined based on the time instant the target object is captured by one camera and the travel time (Δt) of the target object estimated in the above step 530 for the corresponding neighboring camera. In this way, according to the travel time (Δt) of the at least target object estimated by the travel time estimation module of the camera 305-1, only images obtained from the corresponding neighboring camera (e.g. the camera 305-2) during the later time period (such as images captured between 15:02:00 and 15:02:38) are identified as the candidate images and objects of these candidate images are determined as the candidate objects. The candidate objects/images are eligible to be further processed in the following steps to identify the at least one target object, which considerably reduces the number of images and that of objects to be further processed in the following steps especially in the re-identification related steps 550 and 560.

According to an embodiment, the above selection of candidate images and objects is a step 540 which is performed by a candidate selection module. The candidate selection module is for instance structurally and functionally similar to the above-mentioned candidate selection module 630.

Information about the candidate objects or/and the candidate images for each of the neighboring cameras, such as the travel time (Δt) of the at least one target object, the later time period, index numbers of the candidate images and/or index numbers of the candidate objects, can be partially or entirely stored in a local memory device and/or in a candidate database and/or in a candidate reduction module and/or in a re-identification module. Other data structures capable of being utilised for indicating which images/objects are determined as candidate images/objects can be implemented without exceeding the scope of the invention.

As mentioned previously, the relative velocity of an object can be considered as a signature comprising information specific to the object. The method according to embodiments of the invention utilizes thus the relative velocities of objects as a criterion to select, from the candidate objects identified according to the estimated travel time of the target object generated in the step 530, candidate objects presenting respectively a relative velocity substantially equal to the target relative velocity (Vrel-t) of the at least one target object. The number of the candidate objects to be processed by extracting and comparing image-based features of the candidate objects is thus reduced (which reduces the risk of wrongly selecting a candidate object).

More precisely, the method according to embodiments of the invention comprises a step 521 of estimating, for each of the candidate objects, a relative velocity (denoted hereafter as Vrel-c). According to a particular embodiment wherein the re-identification tracking system has a centralized configuration as presented in FIG. 4*a*, the step 521 of estimating a relative velocity (Vrel-c) is performed by the velocity estimation module.

In other embodiments of the invention, for each of the cameras of the video-surveillance system, the velocity estimation module performs continuously the step 521 to generate and store the relative velocity of each of the objects detected by the cameras. The velocity estimation module is for instance structurally and functionally similar to the above-mentioned velocity estimation module 628.

Similar to the above step 520 of estimating a target relative velocity (Vrel-t) of the target object, the velocity estimation module calculates firstly for each of the candidate images obtained during the estimated travel time that the target object may spend to arrive in the field of view 310-2 of the camera (for example, the candidate images being obtained from the camera 305-2 between 15:02:00 and 15:02:38), a relative velocity (Vrel-c) of each of the candidate objects of the candidate image.

Similar to the above step 520, a velocity distribution of the candidate objects of the candidate image is generated in the step 521.

Therefore, when later on it is decided to track a target object, only the steps 520, 530, 540 and 545 are required to be performed, in order to estimate the target relative velocity (Vrel-t) and the travel time (Δt) of the target object captured by a camera to determine the candidate images and the candidate objects detected by the neighboring cameras and then to compare the relative velocity (Vrel-t) of the target object with the relative velocities of the candidate objects which are obtained in the step 521 before knowing the target object to be tracked.

The method comprises a step 545 of comparing the relative velocity (Vrel-t) of the at least one target object captured by a camera and the relative velocity (Vrel-c) of each of the candidate objects captured by the neighboring cameras and selected according to the estimated travel time of the target object generated in the above step 530, so as to refine the selection of candidate objects eligible to be further processed in the following re-identification related steps 550 and 560 (to be described in the following paragraphs).

According to an embodiment, the refined selection of candidate objects is based on the "position" of the velocity of the target object in the velocity distribution associated with the camera from which the target object is detected, that is used as the "position" of the velocity of the candidate objects to be selected in the velocity distribution associated with the camera from which the candidate objects are detected.

As described above, such a "position" of a velocity in a velocity distribution represents a relative velocity.

For the sake of illustration, if the target object velocity belongs to the 10% lowest velocities (in the velocity distribution associated with the camera from which the target object is detected) then the velocity of the candidate objects to be selected should belong to the 10% lowest velocities (in the velocity distribution associated with the camera from which the candidate objects are detected).

According to embodiments of the invention, the step 545 of comparing relative velocities is performed by the candidate selection module, to compare the target relative velocity (Vrel-t) of the target object previously captured by the camera 305-1 and the relative velocity (Vrel-c) of each of the candidate objects previously selected in the step 530 based on the estimated travel time of the target object. Taking a pair of cameras 305-1 and 305-2 as an example, the step 545 of comparing the target relative velocity (Vrel-t) detected by the camera 305-1 with the relative velocity (Vrel-c) of each of the candidate objects detected by the other camera 305-2 of the pair of cameras is performed by the candidate selection module based on data received from the velocity estimation module.

It should be noted that the steps 520, 521, 540 and 545 are fast to process and thus can be calculated in real-time, which is specifically favourable to real-time target object tracking. The target relative velocity (Vrel-t) of the target object and the relative velocities (Vrel-c) of the candidate objects, being considered as dynamical signature information which is camera-independent, are thus utilized to efficiently reduce the number of candidate objects to be processed in the following re-identification related steps 550, 560 of extracting image-based features and selecting a candidate object based on the object features (including the extracted image-based features and the relative velocity) of the selected candidate objects and on the object features of the target object. For example, the number of candidate objects to be processed in the steps 550 and 560 can be reduced from a few thousand or a few hundred to only several tens of candidate objects, which makes it possible to improve the efficiency of tracking objects by decreasing the risk of selecting a wrong candidate object during re-identification. The correct tracking rate is thus increased and the computational resources are considerably saved.

The steps the steps 550 and 560 are performed by a re-identification processing module which is for instance structurally and functionally similar to the above-mentioned re-identification processing module 655.

The computation spent on execution of the steps 501 to 545 of the method according to embodiments of the invention is a negligible additional computation time drag compared to the heavy computation spent on extraction and comparison of image-based features.

The method according to embodiments of the invention comprises the step 550 of extracting, for the at least one target object and each of the candidate objects selected in the above step 545, image-based features of the object that are to be used for re-identification. This step 550 is performed by an object feature extraction module which is for instance structurally and functionally similar to the above-mentioned object feature extraction module 645 of the re-identification processing module 655.

According to an embodiment, a target pose estimation module 640 is used, in cooperation with the object feature extraction module 645, so as to determine, for an object detected by a camera, one or a plurality of obtained images (each of which comprising a sub-image defined by a bounding box) provides at least relatively sufficient object feature information to be extracted by the object feature extraction module 645.

The method according to embodiments of the invention comprises the step 560 of selecting a candidate object from the candidate objects previously selected in the above step 545, based on the object features of the candidate objects which comprise the extracted image-based features and the relative velocity (Vrel-c) of the candidate objects, and the object features of the at least one target object which comprise the extracted image-based features and the target relative velocity (Vrel-t) of the target object. According to embodiments of the invention, this step 560 is performed by a re-identification module which is for instance structurally and functionally similar to the above-mentioned re-identification module 650 of the re-identification processing module 655. Step 560 can be based on standard machine learning methods used in modern re-identification methods.

Figure 12:
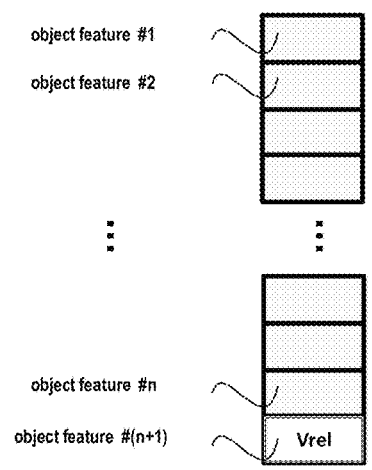
FIG. 12 illustrates a vector comprising n+1 elements wherein n elements represent image-based features of an object and one element represents a relative velocity of the object.

FIG. 12 illustrates object features of an object that can be represented by a vector comprising n+1 elements wherein n elements (such as the object features #1 to #n as shown in FIG. 12) representing extracted image-based features of the object, and the object feature #(n+1) representing the estimated relative velocity of the object. The n+1 elements can be thus considered as a unique signature of the object which provides useful information to distinguish the object from the other objects.

According to the embodiments of the invention, the step 560 comprises, selecting a candidate object from the candidate objects selected in the above step 545, based on the n+1 object features of each of the candidate objects and the n+1 object features of the target object.

It should be noted that the image-based features of the objects, such as colors, textures and/or pixel-based information, may be camera-dependent, that means the image-based features may be affected due to the change of lighting, pose, colorimetry or even simply due to the hardware or software adjustment of cameras, etc. Modern re-identification methods use methods such as "metrics learning" to compensate for those strong differences between camera images, but results are not always optimal. Therefore, taking into account the target relative velocity (Vrel-t) of the target object and the relative velocities (Vrel-c) of the candidate objects, which are less dependent on the images, improves the accuracy of the re-identification result.

The method according to embodiments of the invention for optimizing tracking of at least one target object can be considered as an improvement of conventional re-identification tracking methods in terms of system reliability (e.g. correct tracking rate) and efficiency (e.g. computational time).

Instead of processing all the candidate objects in all candidate images obtained from different cameras according to the conventional re-identification tracking methods, the invention allows to process, during the re-identification related steps (such as steps 550, 560), a much smaller number of candidate objects shown in a much smaller number of candidate images.

The relative velocity can be utilized in the steps performed to reduce the number of candidate objects as well as utilized as an additional object feature in the re-identification related step 560. This improves the correct tracking rate of the method by reducing the number of the candidate objects.

The utilization of the relative velocity further presents at least the following advantages:

- the relative velocity of an object represents a signature of the object which distinguishes the object from others.
- the relative velocity comprises most characteristics of usable recognition criteria for re-identification tracking methods and does not depend on a particular re-identification technique. It can thus be applied or adapted to all existing re-identification tracking methods, which makes it highly upgradeable as soon as progress is made in the re-identification community.
- the relative velocity is generally not affected by the environmental factors such as the nature of path or the presence of crowds or stairs, etc.
- the relative velocity is an average measurement over a plurality of images obtained by a same camera, which makes the relative velocity more robust to small measurement errors.
- compared to conventional image/pixel-based features such as colours or textures, the relative velocity is relatively robust to camera change and not affected by image artifacts generated due to the change of lighting, pose, colorimetry or even simply due to the hardware or software adjustment of cameras.

the relative velocity is very fast to calculate and is very helpful in reducing the number of candidate objects. It results in decreasing the risk of wrongly selecting a candidate object and in saving computational resources.

the implementation of the relative velocity does not require any additional equipment. As mentioned previously, the relative velocity can be generated by using outputs of existing mono-camera trackers.

In addition to the above advantages of estimating and using the relative velocity, the estimation of a global travel time by using a wave diffusion physics theory also helps to increase the accuracy of the estimation of the travel time of the target object. Moreover, the method according to embodiments of the invention is performed fully automatically without human intervention such as manually tagging a group of people shown in images of a video stream.

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for re-identification by a computing device of at least one target object in images obtained from at least two image sources, each of the image sources obtaining images representing an area associated with the corresponding image source, the method comprising:

identifying, by the computer device, at least one target object in images obtained from one of a pair of image sources;

estimating, by the computer device, a relative velocity of the at least one target object in comparison with at least another object previously identified in images obtained from the one of the pair of image sources, wherein the previously identified another object is a moving object; and establishing, by the computer device, based on the estimated relative velocity of the at least one target object, a correspondence between the at least one target object identified in images obtained from the one of the pair of image sources and a plurality of candidate objects represented in images obtained from an other image source of the pair of image sources, thereby determining which among the plurality of candidate objects is the at least one target object; and wherein the method further comprises, by the computer device, a step of extracting, for the at least one target object and each of the plurality of candidate objects, respective image-based features, and a step of selecting at least one candidate object of the plurality of candidate objects based on the extracted image-based features and the relative velocity of each of the plurality of candidate objects, and on the extracted image-based features and the relative velocity of the at least one target object.

2. The method of claim 1, further comprising a step of estimating a travel time of the at least one target object moving from the area associated with the one of the pair of image sources to the area associated with the other image source of the pair of image sources, wherein the step of establishing a correspondence is further performed based on the estimated travel time of the at least one target object.

3. The method of claim 2, further comprising a step of estimating, for the pair of image sources, a global travel time distribution for an object moving from the area associated with the one of the pair of image sources to the area associated with the other image source of the pair of image sources.

4. The method of claim 3, wherein the step of estimating a travel time of the at least one target object is performed based on the global travel time distribution.

5. The method of claim 1, further comprising a step of generating, for each image source of the pair of image sources, an object density measurement which reflects a variation of a number of objects in images obtained via the corresponding image source.

6. The method of claim 5, wherein a global travel time distribution is estimated based on the object density measurements.

7. The method of claim 1, further comprising a step of estimating, for each of the plurality of candidate objects represented in images obtained from the other image source of the pair of image sources, a relative velocity.

8. The method of claim 2, further comprising a step of selecting images obtained by the other image source of the pair of image sources as a function of a time period determined based on the estimated travel time of the target object, the plurality of candidate objects being detected in the selected images.

9. The method of claim 7, further comprising a step of selecting the plurality of candidate objects as a function of a relative velocity of the plurality of candidate objects, the relative velocity of plurality of candidate objects being chosen as a function of the relative velocity of the target object.

10. A non-transitory computer-readable storage medium storing instructions of a computer program for implementing the method according to claim 1.

11. A device for re-identification of at least one target object in images obtained from at least two image sources, each of the image sources obtaining images representing an area associated with the corresponding image source, the device comprising a processor configured for carrying out the steps of:

identifying, by the processor, at least one target object in images obtained from one of a pair of image sources;

estimating, by the processor, a relative velocity of the at least one target object in comparison with at least another object previously identified in images obtained from the one of the pair of image sources, wherein the previously identified another object is a moving object; and establishing, by the processor, based on the estimated relative velocity of the at least one target object, a correspondence between the at least one target object identified in images obtained from the one of the pair of image sources and a plurality of candidate objects represented in images obtained from an other image source of the pair of image sources, thereby determining which among the plurality of candidate objects is the at least one target object; and wherein the device being further configured for extracting, by the computer device, for the at least one target object and each of the plurality of candidate objects, respective image-based features, and a step of selecting at least one candidate object of the plurality of candidate objects based on the extracted image-based features and the relative velocity of each of the plurality of candidate objects, and on the extracted image-based features and the relative velocity of the at least one target object.

12. The device of claim 11, wherein the processor is further configured for carrying out a step of estimating a travel time of the at least one target object moving from the area associated with the one of the pair of image sources to the area associated with the other image source of the pair of image sources, wherein the step of establishing a correspondence is further performed based on the estimated travel time of the at least one target object.

13. The device of claim 12, wherein the processor is further configured for carrying out a step of estimating, for the pair of image sources, a global travel time distribution for an object moving from the area associated with the one of the pair of image sources to the area associated with the other image source of the pair of image sources.

14. The device of claim 13, wherein the processor is further configured so that the step of estimating a travel time of the at least one target object is performed based on the global travel time distribution.

15. The device of claim 11, wherein the processor is further configured for carrying out a step of generating, for each image source of the pair of image sources, an object density measurement which reflects a variation of a number of objects in images obtained via the corresponding image source and wherein the processor is further configured so that a global travel time distribution is estimated based on the object density measurements.

16. The device of claim 11, wherein the processor is further configured for carrying out a step of estimating, for each of plurality of candidate objects represented in images obtained from the other image source of the pair of image sources, a relative velocity.

17. The device of claim 12, wherein the processor is further configured for carrying out a step of selecting images obtained by the other image source of the pair of image sources as a function of a time period determined based on the estimated travel time of the target object, the plurality of candidate objects being detected in the selected images.

18. The device of claim 16, wherein the processor is further configured for carrying out a step of selecting the plurality of candidate objects as a function of a relative velocity of the plurality of candidate objects, the relative velocity of the plurality of candidate objects being chosen as a function of the relative velocity of the target object.

* * * * *